United States Patent
Vaisman et al.

(10) Patent No.: US 11,644,251 B2
(45) Date of Patent: May 9, 2023

(54) THERMAL MANAGEMENT SYSTEMS FOR EXTENDED OPERATION

(71) Applicant: Booz Allen Hamilton Inc., McLean, VA (US)

(72) Inventors: Igor Vaisman, Carmel, IN (US); Joshua Peters, Knoxville, TN (US)

(73) Assignee: Booz Allen Hamilton Inc., McLean, VA (US)

( * ) Notice: Subject to any disclaimer, the term of this patent is extended or adjusted under 35 U.S.C. 154(b) by 0 days.

(21) Appl. No.: 17/846,916

(22) Filed: Jun. 22, 2022

(65) Prior Publication Data
US 2023/0003423 A1 Jan. 5, 2023

Related U.S. Application Data

(60) Provisional application No. 63/213,329, filed on Jun. 22, 2021.

(51) Int. Cl.
*F25B 9/00* (2006.01)
*F25B 19/00* (2006.01)
(Continued)

(52) U.S. Cl.
CPC .............. *F28D 20/021* (2013.01); *F25B 5/04* (2013.01); *F25B 9/008* (2013.01); *F25B 19/005* (2013.01);
(Continued)

(58) Field of Classification Search
CPC ........ F25B 9/008; F25B 39/00; F25B 43/043; F25B 43/006; F25B 2309/06;
(Continued)

(56) References Cited

U.S. PATENT DOCUMENTS

| 10,578,369 B1 | 3/2020 | Johnson et al. |
| 10,746,440 B2 * | 8/2020 | Donovan ................ F25B 40/00 |

(Continued)

FOREIGN PATENT DOCUMENTS

| EP | 3239624 A1 * | 11/2017 | ............ F25B 43/006 |
| EP | 3995758 A1 * | 5/2022 | |
| JP | H06257868 | 9/1994 | |

OTHER PUBLICATIONS

International Search Report and Written Opinion in International Appln. No. PCT/US2022/034595, dated Oct. 12, 2022, 14 pages.
(Continued)

*Primary Examiner* — Miguel A Diaz
(74) *Attorney, Agent, or Firm* — Fish & Richardson P.C.

(57) ABSTRACT

A thermal management system includes a closed-circuit refrigeration system (CCRS) that includes a vapor cycle system (VCS). The VCS includes a receiver configured to store a refrigerant fluid; a liquid separator; a compressor; a condenser; at least one evaporator configured to extract heat from at least one heat load that is in thermal conductive or convective contact with the evaporator; and a thermal energy storage (TES) that stores a phase change material. The thermal management system further includes a liquid pumping system (LPS) that includes the TES, the at least one evaporator, and the liquid separator, with the LPS further including a pump. The VCS is configured to operate one at a time in at least one of three operational modes that are a TES cooling mode, a heat load cooling mode, or a pump-down mode. The LPS is configured to operate in the heat load cooling mode.

50 Claims, 8 Drawing Sheets

(51) Int. Cl.
*F28D 20/02* (2006.01)
*F25B 5/04* (2006.01)
*F25B 41/31* (2021.01)
*F25B 39/00* (2006.01)
*F25B 43/04* (2006.01)

(52) U.S. Cl.
CPC .............. *F25B 39/00* (2013.01); *F25B 41/31* (2021.01); *F25B 43/043* (2013.01); *F25B 2309/061* (2013.01); *F25B 2400/16* (2013.01); *F25B 2400/19* (2013.01); *F25B 2400/23* (2013.01); *F25B 2400/24* (2013.01)

(58) Field of Classification Search
CPC ............ F25B 2309/061; F25B 2400/23; F25B 2400/24; F25B 19/005
See application file for complete search history.

(56) References Cited

U.S. PATENT DOCUMENTS

| | | |
|---|---|---|
| 2003/0159455 A1 | 8/2003 | Aikawa et al. |
| 2004/0216483 A1 | 11/2004 | Inaba et al. |
| 2007/0095093 A1 | 5/2007 | Narayanamurthy |
| 2009/0133412 A1* | 5/2009 | Narayanamurthy .... F25D 16/00 62/66 |
| 2009/0293507 A1* | 12/2009 | Narayanamurthy .. F24F 5/0017 62/509 |
| 2009/0314023 A1 | 12/2009 | Labaste et al. |
| 2011/0011119 A1 | 1/2011 | Kuehl et al. |
| 2011/0048058 A1 | 3/2011 | Narayanamurthy et al. |
| 2013/0111934 A1 | 5/2013 | Wang et al. |
| 2015/0191254 A1 | 7/2015 | Vaisman |
| 2019/0264933 A1* | 8/2019 | Ignatiev .................... F25B 1/10 |
| 2019/0316817 A1 | 10/2019 | Donovan et al. |
| 2019/0316850 A1 | 10/2019 | Snyder et al. |

OTHER PUBLICATIONS

International Search Report and Written Opinion in International Appln. No. PCT/US2022/034591, dated Sep. 28, 2022, 9 pages.

* cited by examiner

THERMAL MANAGEMENT SYSTEMS FOR EXTENDED OPERATION

CLAIM OF PRIORITY

This application claims priority under 35 U.S.C. § 119(e) to U.S. Provisional Patent Application Ser. No. 63/213,329, filed on Jun. 22, 2021, and entitled "THERMAL MANAGEMENT SYSTEMS FOR EXTENDED OPERATION," the entire contents of which are hereby incorporated by reference.

BACKGROUND

Refrigeration systems absorb thermal energy from heat sources operating at temperatures below the temperature of the surrounding environment and discharge thermal energy into the surrounding environment. Heat sources operating at temperatures above the surrounding environment can be naturally cooled by the surrounding if there is direct contact between the source and the environment.

Conventional refrigeration systems include a compressor, a heat rejection heat exchanger (i.e., a condenser), a receiver, an expansion device, and a heat absorption exchanger (i.e., an evaporator). Such systems can be used to maintain operating temperature set points for a wide variety of cooled heat sources (loads, processes, equipment, systems) thermally interacting with the evaporator. Closed-circuit refrigeration systems may pump significant amounts of absorbed thermal energy from heat sources into the surrounding environment.

In closed-circuit systems, compressors are used to compress vapor from an evaporating pressure the evaporator and to a condensing pressure in the condensers and condense the compressed vapor converting the vapor into a liquid at a temperature higher than the surrounding environment temperature. The combination of condensers and compressors can add a significant amount of weight and can consume relatively large amounts of electrical power. In general, the larger the amount of absorbed thermal energy that the system is designed to handle, the heavier the refrigeration system and the larger the amount of power consumed during operation, even when cooling of a heat source occurs over relatively short time periods.

In some cases the surrounding environment temperature can appear below the heat source temperature. The refrigeration system provides a contact via refrigerant. There may be no need to compress vapor from the evaporating to condensing pressure since condensation can happen at a pressure slightly higher or even below the evaporating pressure.

SUMMARY

This disclosure features a thermal management system (TMS) that, in some implementations, enables direct cooling of a phase change material (PCM) in a thermal energy storage (TES), as well as one or more devices being cooled by the TES. The TMS can include a closed-circuit refrigeration system (CCRS), as well as a closed-circuit refrigeration system (CCRS) integrated with an open circuit refrigeration system (OCRS).

In an example implementation, a thermal management system includes a closed-circuit refrigeration system (CCRS) that includes a vapor cycle system (VCS). The VCS includes a receiver configured to store a refrigerant fluid; a liquid separator having an inlet, a vapor-side outlet and a liquid-side outlet; a compressor having a compressor inlet fluidly coupled to the vapor-side outlet; a condenser fluidly coupled to a compressor outlet of the compressor; at least one evaporator having an evaporator inlet coupled in the VCS, with the evaporator configured to extract heat from at least one heat load that is in proximity to or in thermal conductive or convective contact with the at least one evaporator; and a thermal energy storage (TES) that stores a phase change material. The TES includes a heat exchanger that provides thermal interaction between the phase change material and the refrigerant fluid. The thermal management system further includes a liquid pumping system (LPS) that includes the TES, the at least one evaporator, and the liquid separator, with the LPS further including a pump. The VCS is configured to operate one at a time in at least one of three operational modes that are a TES cooling mode, a heat load cooling mode, or a pump-down mode, and the LPS is configured to operate in the heat load cooling mode.

In an aspect combinable with the example implementation, the VCS further includes an expansion valve having an inlet coupled to an outlet of the receiver.

In another aspect combinable with any of the previous aspects, the TES cooling mode charges the TES and the phase change material in the TES by directing refrigerant through the TES from the receiver causing cooling energy from the refrigerant fluid to be stored in the phase change material in latent heat form.

In another aspect combinable with any of the previous aspects, the VCS operates according to a transcritical refrigeration cycle or a subcritical refrigeration cycle.

In another aspect combinable with any of the previous aspects, when the VCS operates in the transcritical refrigeration cycle, the condenser operates as a gas cooler, and the compressor induces refrigerant vapor from the vapor-side outlet of the liquid separator at a low pressure and compresses the refrigerant vapor at the low pressure into a refrigerant vapor at a high pressure and high temperature, with the refrigerant vapor at the high pressure and high temperature being cooled in the gas cooler.

In another aspect combinable with any of the previous aspects, when the VCS operates in a subcritical refrigeration cycle, the compressor induces refrigerant vapor from the vapor-side outlet of the liquid separator at a low pressure and compresses the refrigerant vapor at the low pressure into a refrigerant vapor at a high pressure and temperature, with the refrigerant vapor in the condenser being de-superheated, condensed, and subcooled.

Another aspect combinable with any of the previous aspects further includes at least one heat load that is cooled by the TES operating in the heat load cooling mode.

In another aspect combinable with any of the previous aspects, the liquid pumping system is configured to cool the at least one heat load by discharging the stored cooling energy from the phase change material to the at least one evaporator.

In another aspect combinable with any of the previous aspects, the expansion valve is configured to iso-enthalpically expand the liquid refrigerant from the receiver to a low-pressure, two-phase refrigerant fluid.

In another aspect combinable with any of the previous aspects, a portion of a refrigerant liquid of the low-pressure, two-phase refrigerant fluid phase evaporates to cool the phase change material in the TES, with the liquid separator disposed to receive non-evaporated refrigerant liquid.

In another aspect combinable with any of the previous aspects, the liquid pumping system is configured to evaporate refrigerant fluid at a temperature in a range that is below a heat load temperature low limit and above a phase change material freezing temperature.

In another aspect combinable with any of the previous aspects, the pump is configured to circulate liquid refrigerant from the liquid-side outlet of the liquid separator into the evaporator inlet.

In another aspect combinable with any of the previous aspects, the VCS is configured, with the compressor in an off state, to increase a refrigerant pressure to turn the refrigerant fluid that is in a saturated refrigerant liquid thermodynamic state in the liquid separator into a subcooled state, and the pump is configured to circulate the subcooled refrigerant liquid through the evaporator to cause at least partial evaporation of the refrigerant liquid into refrigerant vapor that is transported to the TES to be condensed and subcooled.

In another aspect combinable with any of the previous aspects, the VCS is configured to return the subcooled refrigerant liquid to the liquid separator, and to complete a cycle of the heat load cooling mode by melting the phase change material has melted and depleting the stored thermal energy.

In another aspect combinable with any of the previous aspects, the compressor is configured to increase a cooling capacity of the VCS in an on state.

In another aspect combinable with any of the previous aspects, the pump is configured to circulate liquid refrigerant from the liquid-side outlet of the liquid separator into an inlet of the TES.

In another aspect combinable with any of the previous aspects, when the phase change material melts, the stored thermal energy is depleted and the heat load cooling mode has completed a cycle of operation.

In another aspect combinable with any of the previous aspects, when in the pump-down mode, the refrigerant liquid accumulated in the liquid separator is returned to the receiver.

In another aspect combinable with any of the previous aspects, the expansion valve is a first expansion valve and the TES is a first TES.

Another aspect combinable with any of the previous aspects further includes a second expansion valve having an inlet coupled to the outlet of the receiver; and a second TES having an inlet coupled to an outlet of the second expansion valve and an outlet coupled to the inlet of the liquid separator.

In another aspect combinable with any of the previous aspects, the system implements the following sequence with the first TES cooling a low heat load with the VCS off, the second TES cooling the low heat load, and the VCS cooling the first TES and the low heat load is OFF, and the VCS cooling the second TES.

In another aspect combinable with any of the previous aspects, the pump is configured to circulate refrigerant liquid from the liquid-side outlet through at least one of first or second TES to subcool the refrigerant liquid and transport the subcooled refrigerant liquid to the evaporator, causing complete or partial evaporation of the refrigerant, with refrigerant vapor formed in the evaporator being captured by the liquid separator.

Another aspect combinable with any of the previous aspects further includes a recuperative heat exchanger having a pair of refrigerant fluid paths, with a first refrigerant fluid path coupled downstream of the receiver and a second refrigerant fluid path coupled upstream of the liquid separator.

Another aspect combinable with any of the previous aspects further includes an open-circuit refrigerant system (OCRS) including the receiver, the expansion valve, the TES, the evaporator, and the liquid separator, with the expansion valve configured to control vapor quality of refrigerant fluid at the outlet of the evaporator.

In another aspect combinable with any of the previous aspects, the OCRS further includes an exhaust line; and a back-pressure regulator having an inlet coupled to the VCS and having an outlet coupled to the exhaust line, with the back-pressure regulator configured to control a temperature of the heat load.

In another aspect combinable with any of the previous aspects, the VCS operates according to a subcritical refrigeration cycle.

Another aspect combinable with any of the previous aspects further includes a recuperative heat exchanger having a pair of refrigerant fluid paths, with a first refrigerant fluid path coupled downstream of the receiver and a second refrigerant fluid path coupled upstream of the liquid separator.

In another aspect combinable with any of the previous aspects, the recuperative heat exchanger is configured to provide thermal contact between the liquid refrigerant leaving the receiver and the refrigerant vapor from the liquid separator.

Another aspect combinable with any of the previous aspects further includes an ejector having a primary inlet, a secondary inlet, and an outlet fluidly coupled to the evaporator inlet.

In another aspect combinable with any of the previous aspects, the evaporator is a first evaporator, and the system further includes a second evaporator.

In another aspect combinable with any of the previous aspects, the second evaporator has an inlet coupled to a receiver outlet and the second evaporator has an outlet coupled to a compressor inlet.

In another aspect combinable with any of the previous aspects, the second evaporator is configured to cool a high temperature heat load, and the system further includes a second expansion valve coupled to the receiver outlet and the inlet to the second evaporator.

In another aspect combinable with any of the previous aspects, the refrigerant includes ammonia or carbon dioxide.

In another example implementation, a thermal management method includes transporting a refrigerant fluid along a closed-circuit refrigerant fluid flow path that includes a vapor cycle system (VCS). The VCS includes a receiver having a receiver outlet fluidly coupled to: a thermal energy storage (TES) that stores a phase change material, to a liquid separator having a liquid separator inlet, and to an evaporator, with the liquid separator having a vapor-side fluidly coupled to a compressor and a condenser fluidly coupled to a compressor outlet, and with the condenser having a condenser outlet fluidly coupled to a receiver inlet. The method further includes operating the VCS according to at least one of three operational modes that include: a TES cooling mode, a heat load cooling mode, or a pump-down mode.

In an aspect combinable with the example implementation, transporting the refrigerant fluid from the receiver includes transporting the refrigerant fluid through an expansion valve.

Another aspect combinable with any of the previous aspects further includes control a vapor quality of the refrigerant fluid at an outlet of the evaporator with the expansion valve.

Another aspect combinable with any of the previous aspects further includes thermally contacting the phase change material and the refrigerant fluid in the TES.

Another aspect combinable with any of the previous aspects further includes operating the VCS in the TES cooling mode by charging the phase change material in the TES by directing refrigerant though the TES from the receiver to store cooling energy in the phase change material in latent heat form.

Another aspect combinable with any of the previous aspects further includes operating the VCS according to a transcritical refrigeration cycle or a subcritical refrigeration cycle.

Another aspect combinable with any of the previous aspects further includes operating the VCS in the transcritical refrigeration cycle by causing the condenser to operate as a gas cooler; compressing, by the compressor, vapor from a vapor-side outlet of the liquid separator that is induced at a low pressure to compress the refrigerant vapor at the low pressure into a refrigerant vapor at a high pressure and high temperature; cooling the refrigerant vapor at the high pressure and high temperature in the gas cooler.

Another aspect combinable with any of the previous aspects further includes operating the VCS in a subcritical refrigeration cycle; and condensing the refrigerant vapor in the condenser by de-superheating, condensing, and subcooling the refrigerant vapor to produce subcooled refrigerant liquid.

Another aspect combinable with any of the previous aspects further includes iso-enthalpically expanding the liquid refrigerant from the receiver in the expansion valve to a low-pressure two-phase mixture of a refrigerant liquid phase and a refrigerant vapor phase.

Another aspect combinable with any of the previous aspects further includes boiling a portion of the refrigerant liquid phase out from the phase change material in the TES; and capturing non-evaporated refrigerant liquid by the liquid separator.

In another aspect combinable with any of the previous aspects, the closed-circuit refrigerant fluid flow path further includes a liquid pumping system that includes a pump, the method further including operating the liquid pumping system to cool the heat load by discharging the stored cooling energy from the phase change material.

Another aspect combinable with any of the previous aspects further includes evaporating, with the liquid pumping system, refrigerant at a temperature in a range that is below the heat load temperature low limit and above a phase change material freezing temperature.

In another aspect combinable with any of the previous aspects, when the compressor is in an off state, the method further includes converting refrigerant pressure of the refrigerant in the VCS that is in a saturated refrigerant liquid thermodynamic state in the liquid separator into a subcooled state; and circulating, with the pump, the subcooled refrigerant liquid through the evaporator to cause complete or partial evaporation of the refrigerant fluid, with refrigerant vapor formed in the evaporator being captured by and condensed and subcooled in the TES.

Another aspect combinable with any of the previous aspects further includes returning the subcooled refrigerant liquid to the liquid separator; and completing a cycle of operation of the heat load cooling mode when the phase change material has melted and the stored thermal energy is depleted.

Another aspect combinable with any of the previous aspects further includes discharging a portion of refrigerant vapor from the vapor-side outlet through an open-circuit refrigerant system (OCRS) including the receiver, the expansion valve, the TES, the evaporator, and the liquid separator.

In another aspect combinable with any of the previous aspects, the OCRS further includes a flow control device configurable to control a temperature of the heat load; and an exhaust line, with the discharged portion of the refrigerant vapor not returning to the receiver.

Another aspect combinable with any of the previous aspects further includes directing the refrigerant through a recuperative heat exchanger having a pair of refrigerant fluid paths, with a first refrigerant fluid path coupled downstream of the receiver and a second refrigerant fluid path coupled upstream of the liquid separator.

Another aspect combinable with any of the previous aspects further includes directing the refrigerant through a primary inlet of an ejector, with the ejector further having a secondary inlet and an outlet fluidly coupled to the evaporator inlet.

In another aspect combinable with any of the previous aspects, the evaporator is a first evaporator, and the method further includes directing a portion of the refrigerant fluid from the receiver to a second evaporator.

Another aspect combinable with any of the previous aspects further includes cooling a high temperature heat load with the second evaporator.

In another aspect combinable with any of the previous aspects, the refrigerant fluid includes ammonia or carbon dioxide.

One or more of the above aspects may provide one or more of the following advantages and/or other advantages as disclosed herein.

The TES increases the cooling capacity of the TMS when a low heat load and/or a high heat load is activated, but without a duty cycle cooling penalty commonly encountered with TES systems, i.e., due to use of a secondary fluid to cool the phase change material. The cooling duty cycle, therefore, is executed without the concomitant penalty found in conventional TES systems.

The details of one or more embodiments are set forth in the accompanying drawings and the description below. Other features and advantages will be apparent from the description, drawings, and claims.

DETAILED DESCRIPTION

Figure 1:
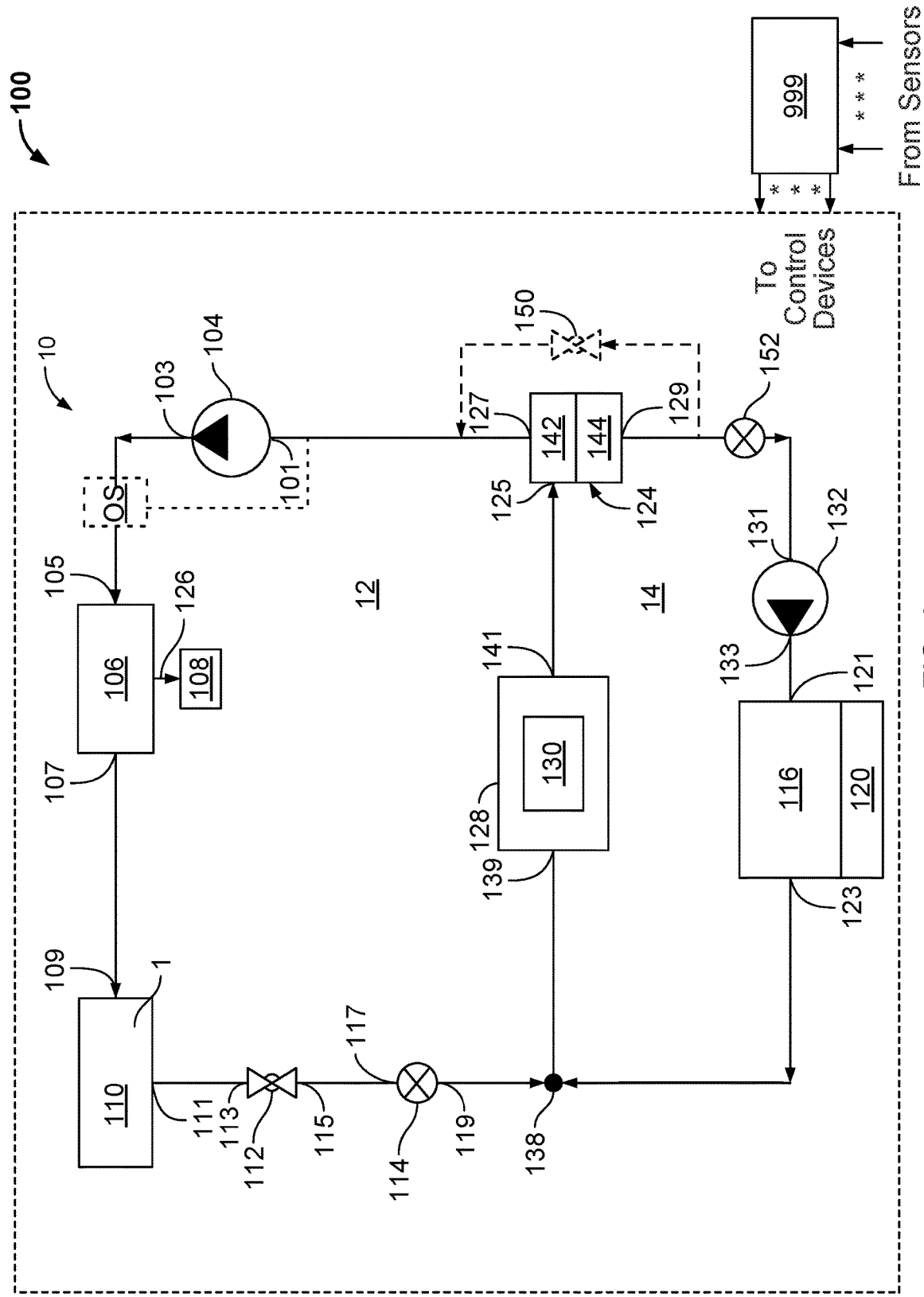
FIGS. 1-4 are schematic diagrams of example implementations of a thermal management system (TMS) that includes a thermal energy storage (TES) according to the present disclosure.

Cooling of high heat loads that are also highly temperature sensitive can present a number of challenges. On one hand, such loads generate significant quantities of heat that is extracted during cooling. In conventional closed-cycle refrigeration systems, cooling high heat loads typically involves circulating refrigerant fluid at a relatively high mass flow rate. However, closed-cycle system components that are used for refrigerant fluid circulation—including compressors and condensers—are typically heavy and consume significant power. As a result, many closed-cycle systems are not well suited for deployment in mobile platforms—such as on small vehicles—where size and weight constraints may make the use of large compressors and condensers impractical.

Temperature sensitive loads such as electronic components and devices may require temperature regulation within a relatively narrow range of operating temperatures. Maintaining the temperature of such a load to within a small tolerance of a temperature set point can be challenging when a single-phase refrigerant fluid is used for heat extraction, since the refrigerant fluid itself will increase in temperature as heat is absorbed from the load.

Directed energy systems that are mounted to mobile vehicles such as trucks may present many of the foregoing operating challenges, as such systems may include high heat, temperature sensitive components that require precise cooling during operation in a relatively short time. The thermal management systems disclosed herein, while generally applicable to the cooling of a wide variety of thermal loads, are particularly well suited for operation with such directed energy systems.

In particular, the thermal management systems and methods disclosed herein include a number of features that reduce both overall size and weight relative to conventional refrigeration systems, and still extract excess heat energy from both high heat, highly temperature sensitive components and relatively temperature insensitive components, to accurately match temperature set points for the components. At the same time, the disclosed thermal management systems require no significant power to sustain their operation. Whereas certain conventional refrigeration systems used closed-circuit refrigerant flow paths, the systems and methods disclosed herein use open-cycle refrigerant flow paths. Depending upon the nature of the refrigerant fluid, exhaust refrigerant fluid may be incinerated as fuel, chemically treated, and/or simply discharged at the end of the flow path.

In some aspects, "refrigeration" as used in the present disclosure can mean a system (or multiple systems fluidly coupled) that operates to generate a purposeful change of a characteristic of a coolant (e.g., a refrigerant fluid) to effectuate or increase heat transfer between two mediums (one of which can be the coolant). The purposeful change of the characteristic can be, for example, a change in pressure (e.g., depressurization) of a pressurized coolant though an expansion valve. In some embodiments, the change in pressure can include a phase change of the coolant, such as a liquid-to-gas phase change (e.g., endothermic vaporization). In some embodiments, pressurization of the refrigerant can be performed by a powered (e.g., electrically or otherwise) component, such as (but not limited to) a compressor. In some embodiments, pressurization can be performed as part of the refrigeration cycle (e.g., a closed-cycle refrigeration process in which gaseous refrigerant is substantially or completely recycled and compressed into a liquid state) or prior to use (e.g., storing pre-compressed liquid refrigerant for later use in an open-cycle refrigeration process in which a reserve of liquid refrigerant is used but substantially not recycled). In some embodiments, the phase change can be driven by heating a liquid refrigerant with a very low boiling point (e.g., ammonia as used in an absorption-type refrigeration cycle).

Referring now to FIG. 1, an example of a thermal management system (TMS) 100 is shown to include a vapor cycle system (VCS) 12 and a liquid pumping system (LPS) 14 that are arranged in a closed-circuit refrigeration system (CCRS) 10. The VCS 12 includes a receiver 110 having inlet 109 and an outlet 111, an optional solenoid valve 112 having an inlet 113 and outlet 115, an optional flow control device 114 (e.g., an optional expansion valve 114) having an inlet 117 and outlet 119, an evaporator 116 (with example configurations shown in FIGS. 5A-5D) having an inlet 121 and outlet 123, a thermal energy storage (TES) 128 having an inlet 139 and outlet 141, a liquid separator 124, a compressor 104 having an inlet 101 and outlet 103, and a condenser 106, coupled in a vapor compression path. The TES 128 contains a phase change material (PCM) 130, as shown in FIG. 1. The LPS 14 includes a pump 132 having an inlet 131 and outlet 133, the evaporator 116, the TES 128, and the liquid separator 124 coupled in a liquid pumping path. The liquid separator 124 includes an inlet 125, a vapor-side outlet 127, and a liquid-side outlet 129, as well as a vapor section 142 and a liquid section 144. A thermal load, i.e., a low heat load 120 (e.g., relatively low heat load over relatively long-time intervals) is in thermal conductive and/or convective contact or in proximity to evaporator 116. The portions of the LPS 14 and VCS 12 are coupled, via conduit and a junction 138, as shown.

In some aspects, the pump 132 is located distal from the liquid-side outlet 129. This configuration potentially presents the possibility of cavitation. In another example, the pump 132 is located distal from the liquid-side outlet 129, but the inlet 125 has a sensor to sense when a column of liquid in the liquid separator 124 reaches a certain height. This configuration potentially minimizes the possibility of cavitation. To further minimize the possibility of cavitation, the pump 132 can be located close to the liquid-side outlet 129, and a height at which the inlet 125 is located is relatively high in the liquid separator 124. This would result in an increase in liquid pressure at the liquid-side outlet 129, and concomitant therewith an increase in liquid pressure at the inlet of the pump 132. Increasing the pressure at the inlet to the pump 132 should minimize any possibility of cavitation. Another strategy can be to locate the pump 132 proximate to or indeed inside of the liquid-side outlet 129. In addition, the height at which the inlet 125 is located can be relatively high as noted. This would result in an increase in liquid pressure at the inlet of the pump 132 further minimizing the possibility of cavitation. Any of the modifications described can use a sensor that produces a signal that is a measure of the height of a column of liquid in the liquid separator 124. The signal is sent to the control system 999 that will be used to start the pump 132 once a sufficient height of liquid is contained by the liquid separator 124.

The receiver 110 stores refrigerant fluid 1, e.g., a refrigerant liquid or mixed-phase fluid. Receiver 110 includes inlet 109, outlet 111, and, in some aspects, a pressure relief valve. To charge receiver 110, refrigerant fluid 1 is typically introduced into receiver 110 via inlet 109, and this can be done, for example, at service locations. Operating in the field, the refrigerant exits receiver 110 through outlet 111. In case of emergency, if the pressure within receiver 110 exceeds a pressure limit value, a pressure relief valve opens to allow a portion of the refrigerant fluid 1 to escape through the valve to reduce the pressure within receiver 110. Receiver 110 can also include insulation (not shown) applied around the receiver. In general, receiver 110 can have a variety of different shapes. In some embodiments, for example, the receiver 110 is cylindrical. Examples of other possible shapes include, but are not limited to, rectangular prismatic, cubic, and conical. In certain embodiments, receiver 110 can be oriented such that outlet 111 is positioned at the bottom of the receiver 110.

The expansion valve 114 functions as a flow control device in some aspects. In general, expansion valve 114 can be implemented as any one or more of a variety of different mechanical and/or electronic devices. For example, in some embodiments, expansion valve 114 can be implemented as a fixed orifice, a capillary tube, and/or a mechanical or electronic expansion valve. In general, fixed orifices and capillary tubes are passive flow restriction elements which do not actively regulate refrigerant fluid flow.

Typical electrical expansion valves include an orifice, a moving seat, a motor or actuator that changes the position of the seat with respect to the orifice, a control system 999 (an example implementation shown in FIG. 6), and pressure and temperature sensors at the evaporator exit. The control system 999 calculates the superheat for the expanded refrigerant fluid based on pressure and temperature measurements at the evaporator exit. If the superheat is above a set-point value, the seat moves to increase the cross-sectional area and the refrigerant fluid volume and mass flow rates to match the superheat set-point value. If the superheat is below the set-point value, the seat moves to decrease the cross-sectional area and the refrigerant fluid flow rates. Mechanical expansion valves (usually called thermostatic or thermal expansion valves) are typically flow control devices that enthalpically expand a refrigerant fluid from a first pressure to an evaporating pressure, controlling the superheat at the evaporator exit. Mechanical expansion valves generally include an orifice, a moving seat that changes the cross-sectional area of the orifice and the refrigerant fluid volume and mass flow rates, a diaphragm moving the seat, and a bulb at the evaporator exit. The bulb is charged with a fluid and it hermetically fluidly communicates with a chamber above the diaphragm. The bulb senses the refrigerant fluid temperature at the evaporator exit (or another location) and the pressure of the fluid inside the bulb, transfers the pressure in the bulb through the chamber to the diaphragm, and moves the diaphragm and the seat to close or to open the orifice. Examples of suitable commercially available expansion devices that can function as expansion valves include, but are not limited to, thermostatic expansion valves available from the Sporlan Division of Parker Hannifin Corporation (Washington, Mo.) and from Danfoss (Syddanmark, Denmark).

The control system 999 calculates the superheat for the expanded refrigerant fluid based on pressure and temperature measurements at the evaporator exit. If the superheat is above a set-point value, the seat moves to increase the cross-sectional area and the refrigerant fluid volume and mass flow rates to match the superheat set-point value. If the superheat is below the set-point value the seat moves to decrease the cross-sectional area and the refrigerant fluid flow rates. The control system 999 may be configured to control vapor quality at the evaporator exit as disclosed below.

In some implementations of the CCRS 10 (and other example implementations of a CCRS according to the present disclosure, oil is used for lubrication of the compressor 104 and the oil travels with the refrigerant in the CCRS 10. In FIG. 1, the liquid separator 124 liquid-side outlet 129 can be used for oil recovery. The oil is removed from the refrigerant at the liquid-side outlet 129 of the liquid separator 124, and is recirculated back to the compressor 104 inlet, via opening a valve (e.g., a solenoid valve 150) and closing an orifice 152 to return oil from the liquid-side outlet of the liquid separator 124 to the compressor 104. Alternatively or additionally, the CCRS 10 may include an oil separator OS (as shown). As shown, the OS is disposed in an oil return path (denoted by a dashed line). Similar oil recovery arrangements can be provided for the other embodiments disclosed herein, even if not expressly shown.

The condenser 106 can operate as a condenser in subcritical VCS operation and as a gas cooler in transcritical VCS operation (with the term "condenser" used herein for both types of heat rejection heat exchangers). A fan 108 (or pump 108) circulates an airflow 126 (or water flow 126 as appropriate) through the condenser 106 to cool the refrigerant fluid circulating in the condenser 106 between the inlet 105 and the outlet 107. In some aspects, subcritical refrigeration includes four specific processes: evaporation, compression, condensation, and expansion. Subcritical system refrigeration has all of these processes occurring below the refrigerant fluid critical temperature. On the other hand, in some aspects, transcritical refrigeration is a process in which at least a portion of the refrigeration cycle occurs at pressures that are above the critical pressure of the refrigerant fluid 1 and other parts of the transcritical refrigeration cycle occur at pressures that are below the critical pressure.

Evaporator 116 can be implemented in a variety of ways. In general, evaporator 116 functions as a heat absorption exchanger, providing thermal contact between the refrigerant fluid 1 and heat loads 120, 118 (described later), or other heat loads. Typically, evaporator 116 includes one or more flow channels extending internally between an inlet and an outlet of the evaporator, allowing refrigerant fluid to flow through the evaporator 116 and absorb heat from heat loads in thermal contact with the evaporator 116. A variety of different evaporators can be used. In general, any cold plate may function as the evaporator 116 of the open circuit refrigeration systems disclosed herein as well. Evaporator 116 can accommodate any refrigerant fluid channels (including mini/micro-channel tubes), blocks of printed circuit heat exchanging structures, or more generally, any heat exchanging structures that are used to transport single-phase or two-phase fluids. The evaporator 116 and/or components thereof, such as fluid transport channels, can be attached to the heat load mechanically, or can be welded, brazed, or bonded to the heat load in any manner. In some implementations, evaporator 116 (or certain components thereof) can be fabricated as part of heat loads, such as high heat load 118 or low heat load 120 or otherwise integrated into such heat loads. When integrated, the portion of heat loads can include refrigerant fluid channel(s) together with, e.g., a the cold plate, to effectively function as the evaporator 116 for the TMS 100 (or other example TMS according to the present disclosure).

The TES 128, in this example, is a heat exchanger that provides thermal contact between PCM 130 and the refrigerant fluid, e.g., from the expansion valve 114. For example, one side of the TES 128 contains the PCM 130 and the other side may accommodate the refrigerant stream. A TES heat exchanger may be configured as shell-tube heat exchanger that has coolant tubes within the shell, and where the PCM 130 is disposed inside the shell with refrigerant passing through the tubes. The TES 128 can be configured as a slab filled with PCM 130 and with extruded mini/macro channel tubes running through the slab. Alternatively, the PCM 130 can be encapsulated and emerged in the liquid refrigerant in the shell or in the liquid separator 124. Other TES architectures would work.

In this example, a single component of each of solenoid valve 112, expansion valve 114, TES 128 are fluidly coupled. In a modified configuration of the CCRS 10, two sets of solenoid valves 112 and expansion valves 114 are located between the receiver outlet 111 and the inlet 125 of the liquid separator 124, with two TES 128 (with corresponding PCM 130) positioned in a parallel arrangement as well. Each TES 128 can be associated with its own optional solenoid valve 112 and its own optional expansion valve 114, and is configured to generate a subcooling during discharge. Further, each TES 128 optional solenoid valves can be disposed in parallel and fluidly coupled to the outlet 123 of evaporator 116 and inlets 139 of the TES 128 (both), via junctions.

In another modified configuration of the CCRS 10, the locations of the TES 128 and evaporator 116 can be switched within the LPS 14. For example, the TES 128 can be disposed such that the inlet 139 is fluidly coupled to the outlet 133 of the pump 132 and, the outlet 141 is fluidly coupled to an inlet to the junction 140. Further, the inlet 121 of the evaporator 116 (and low heat load 120) can be fluidly coupled to the junction 138, while the outlet 123 is fluidly coupled to inlet 125 of the liquid separator 124.

In this example implementation of TMS 100 including VCS 12, the VCS 12 can operate in three operational modes: (1) a TES cooling mode; (2) a heat load cooling mode; and (3) an optional pump-down mode.

Initially, each TMS disclosed herein can operate differently at, and immediately following, system start-up, compared to the manner in which the systems operate after an extended running period. Upon start-up, the compressor 104 and a cooling device (e.g., fan 108) moving a cooling fluid (e.g., ambient air 126) through the condenser 106 are powered. The compressor 104 discharges compressed refrigerant into the condenser 106. The refrigerant is condensed and subcooled in the condenser 106. Liquid refrigerant fluid enters receiver 110 at a pressure and temperature generated by operation of the compressor 104 and condenser 106.

In an example TES cooling mode, the pump 132 is either in the "ON" or the 'OFF' states and the low heat load 120 is "OFF." The VCS 12 operates to "charge" the TES 128 and, more particularly, the PCM 130 in the TES 128 by directing refrigerant fluid 1 though the TES 128 from the expansion valve 114. Cooling energy from the refrigerant is stored in the PCM 130 in latent heat form. The VCS 12 cools (e.g., freezes) the PCM 130 in the TES 128. The evaporating temperature of refrigerant fluid that has thermal contact with the PCM 130 is lower than the freezing temperature to enable heat transfer from the PCM 130 to the refrigerant. Since there is no active low heat load 120, the VCS 12 operates at its lowest evaporating temperature. The compressor 104 induces vapor from the vapor-side outlet 127 of the liquid separator 124 at a low pressure and compresses it to a high pressure. The vapor that is at the high pressure and temperature is cooled in the condenser 106.

When the VCS 12 is transcritical, the condenser 106 operates as a gas cooler. In some aspects, during transcritical operation (or when a transcritical refrigerant such as carbon dioxide is used for refrigerant fluid 1), the receiver 110 may not be used. When the VCS operation is subcritical, the condenser 106 operates as a condenser. When operating as a condenser, the refrigerant vapor is de-superheated, condensed, and subcooled.

Liquid refrigerant from the condenser 106 enters the receiver 110. In the expansion valve 114, the refrigerant at the high pressure is iso-enthalpically expanded to the low pressure and turns into a two-phase (liquid-vapor) mixture. The liquid portion boils out, cooling/freezing the PCM 130. The more the PCM 130 freezes, the less the heat load would be on the boiling refrigerant in the TES 128, and at the same time the evaporator 116 generates less vapor for the compressor 104 to pump. The equilibrium between the compressor 104 and the reduced amount of formed vapor results in a reduced suction pressure, evaporating pressure, and evaporating temperature.

As mentioned above, the pump 132 may be in either the 'ON' or the 'OFF' states. If there is a risk of over-cooling the heat load 118, the pump 132 should stay in the OFF state. If the TES 128 is in the liquid separator 124, the pump 132 should stay in the 'ON' state.

The expansion valve 114 can be configured to generate a superheat or vapor quality at the outlet 141 of the TES 128. If the pump 132 stays OFF, then the expansion valve 114 can monitor a superheat; if the pump 132 is operated to stay ON, then the expansion valve 114 can control the compressor suction pressure. In the first case at the end of the cooling mode, the solenoid valve 112 and the expansion valve 114 are opened to charge the liquid separator 124 with liquid refrigerant. In the second case, liquid refrigerant is continuously fed to the liquid separator 124.

The receiver 110 and the liquid separator 124 are configured to manage liquid refrigerant charge moving from the receiver 110 to the liquid separator 124. The receiver 110 contains a sufficient amount of refrigerant liquid, and the volume of the liquid separator 124 is configured to accommodate all of the non-evaporated liquid.

In modified implementations of the TMS 100 that include a modified dual, parallel arrangement of TES 128 (as previously discussed), the heat load cooling mode can be executed as follows. For example, one TES 128 can operate to cool the low heat load 120 in evaporator 116, and the VCS 12 is OFF. As another example, one TES 128 cools the low heat load 120 in evaporator 116, and the VCS 12 cools the other TES 128 (to cool the PCM 130) while the associated low heat load 120 is OFF. Then, the VCS 12 cools the one TES 128 that was previously cooling the low heat load 120 in the evaporator 116.

The VCS 12 can operate in a heat load cooling mode as well. In an example operation, the low heat load 120 is ON, meaning that the low heat load 120 is operational and is generating heat that is removed by the evaporator 116. The operation of the low heat load 120 causes the LPS 14 to engage and to cool the low heat load 120 by discharging the stored cooling energy from the PCM 130.

The LPS 14 is configured to evaporate refrigerant at a temperature that is below the heat load temperature low limit, in order to satisfy the heat load temperature tolerances and the heat transfer rate generated by a temperature differential, and above the PCM 130 freezing temperature to enable operation of the TES 128, as a condenser.

It can be important to prevent cavitation in the pump 132. To avoid cavitation, the liquid at the pump inlet is subcooled by maintaining a net positive suction head. Subcooling generated in the TES 128 and/or hydrostatic pressure of the liquid column in the liquid separator 124 contribute to developing the net positive suction head.

The heat load cooling mode may start operation either while the compressor 104 is OFF or while the compressor 104 continues to operate. If the TES 128 generates subcooling at the outlet 141, then the compressor 104 should be shut down. The subcooled liquid generated at the outlet 141 enters the inlet 125 of the liquid separator 124, and the LPS 14 operates as a regular closed-circuit pumping system. If the TES 128 generates a vapor quality at the outlet 141, then the vapor/liquid refrigerant is fed to the liquid separator 124 and the vapor portion (i.e., vapor section 142) of the vapor/liquid refrigerant exits from the vapor-side outlet 127 and feeds the inlet 101 of the compressor 104.

In the heat load cooling mode, the VCS 12 and LPS 14 may operate simultaneously. In this case, the compressor 104 continues to operate in the heat load cooling mode, as well. This operation allows the overall cooling capacity of TES 128 to increase and/or extends the cooling period. When the PCM 130 melts and the stored thermal energy depletes the low heat load 120, cooling mode is over.

In some aspects, the heat load cooling mode may not require active control of the thermodynamic state at the outlet 123 of evaporator 116. For example, the pump 132 may be configured to generate at the evaporator outlet 123 a vapor quality below the critical vapor quality under all operating conditions. The pumping capacity and the exit vapor quality are related. That is, if the pumping capacity is too low, the pumping flow rate that results causes higher vapor quality, which may exceed the critical vapor quality. On the other hand, if the pumping capacity is too high, the pumping flow rate reduces the exit vapor quality, but requires higher parasitic pumping power and elevates the risk of cavitation.

However, generally the liquid pumping power is very low thus the parasitic load on the TES 128 is not significant. Therefore, there is a significant amount of pumping flow rate increase that is possible to maintain exit vapor quality low enough under conditions of the entire operating envelope, while avoiding the higher parasitic pumping power or elevating the risk of cavitation. Alternatively, the pump 132 may be configured to generate a superheat at the evaporator outlet 123.

VCS 12 can also operate in a pump-down mode. For example, in the pump-down mode, the refrigerant liquid accumulated in the liquid separator 124 is returned to the receiver 110. In the pump-down mode, the low heat load 120 is OFF, the pump 132 is OFF, the optional solenoid valve 112 and/or the expansion valve 114 are closed and the compressor 104 is ON. The compressor 104 drives vapor from the liquid separator 124 and returns it to the receiver 110 via the condenser 106 (operating as a condenser rather than a gas cooler) by condensing the compressed vapor outputted by the compressor 104. During compressor operation, the pressure in the liquid separator 124 is reduced, the evaporating temperature is reduced, and refrigerant fluid evaporates, generating new portions for the compressor 104 to compress.

Various indicators can be used to show that the receiver 110 is full. Some of these indicators include: the temperature downstream from the condenser 106 and the pressure of the high side indicating a certain amount of sub-cooling, a certain amount of pressure on the high side at a given ambient temperature, a certain amount of liquid level in the receiver 110, a certain amount of liquid level in the liquid separator 124, a certain value of a suction pressure, and/or a certain value of a pumping down period. When the pump-down is completed, the VCS 12 executes the first mode again and gets ready to cool the low heat load 120 again.

In some aspects of TMS 100 (and other example TMS), if the expansion valve 114 has a capability to stop refrigerant flow from the receiver 110, the solenoid control valve 112 may not be needed. If the expansion valve 114 provides an active control of the superheat, the liquid migration from the receiver 110 to the liquid separator 124 does not happen, and the pump-down mode is not performed. Rather, the VCS 12 executes the TES cooling mode, and gets ready to cool the low heat load 120 again. The liquid separator 124 requires a certain level of liquid in the liquid separator 124 for enabling pump operation, while, an excessive amount of liquid at the vapor-side outlet 127 of the liquid separator 124 can damage the compressor 104.

The TES 128 can generate a vapor quality during the discharge or the TES 128 can generate a subcooling during the discharge. When the TES 128 generates vapor quality, the VCS 12 and TES 128 may operate simultaneously. The TES 128 and the VCS 12 are configured to fully satisfy the low heat load 120 at any given duty cycle. The TMS 100 is configured to cool the TES 128 within the cycle period, when the heat load is OFF. In this arrangement, pump cavitation can be a concern.

When the TES 128 generates subcooling, the TES 128 and VCS 12 operate in sequence since there is no vapor for the compressor 104 to compress. The TES 128 is configured to fully satisfy the low heat load 120 at any given duty cycle. As in the vapor quality case, the TMS 100 is configured to cool the TES 128 within the cycle period when the low heat load 120 is OFF. However, in the subcooling case, the TES 128 and VCS 12 are configured to handle larger heat loads than those in the vapor quality case to maintain the same duty cycle. The larger the duty cycle is, the larger the TES 128 and VCS 12 are required. Pump cavitation may not be a concern in the subcooling case.

As shown in FIG. 1, the TMS 100, as all disclosed embodiments, also includes the control system (or controller) 999 (see FIG. 6 for an exemplary embodiment) that produces control signals (based on sensed thermodynamic properties) to control operation of one or more of the various devices, e.g., optional solenoid control valve 112, expansion valve 114, etc., as needed, as well as to control operation of a motor of the compressor 104, fan 108, or other components in other example implementations of a TMS. Control system 999 may receive signals, process received signals and send signals (as appropriate) from/to the sensors and control devices to operate the TMS 100.

The term "control system," as used herein, can refer to an overall system that provides control signals and receives feedback data from unit controllers, such as unit controllers (e.g., programmable logic controllers, motor controllers, variable frequency drives, actuators). In some aspects, the control system includes the overall system and the unit controllers. In some aspects, a control system simply refers to as a single unit controller or a network of two or more individual unit controllers that communicate directly with each other (rather than with an overall system.

The process streams (e.g., refrigerant flows, ambient airflows, other heat exchange fluid flows) in a TMS according to the present disclosure, as well as process streams within any downstream processes with which the TMS is fluidly coupled, can be flowed using one or more flow control systems (e.g., that include the control system 999) implemented throughout the system. A flow control system can include one or more flow pumps, fans, blowers, or solids conveyors to move the process streams, one or more flow pipes through which the process streams are flowed and one or more valves to regulate the flow of streams through the pipes, whether shown in the exemplary figures or not. Each of the configurations described herein can include at least one variable frequency drive (VFD) coupled to a respective pump or fan that is capable of controlling at least one fluid flow rate. In some implementations, liquid flow rates are controlled by at least one flow control valve.

In some embodiments, a flow control system can be operated manually. For example, an operator can set a flow rate for each pump or transfer device and set valve open or close positions to regulate the flow of the process streams through the pipes in the flow control system. Once the operator has set the flow rates and the valve open or close positions for all flow control systems distributed across the system, the flow control system can flow the streams under constant flow conditions, for example, constant volumetric rate or other flow conditions. To change the flow conditions, the operator can manually operate the flow control system, for example, by changing the pump flow rate or the valve open or close position.

In some embodiments, a flow control system can be operated automatically. For example, the flow control system can be connected to a computer or control system (e.g., control system 999) to operate the flow control system. The control system can include a computer-readable medium storing instructions (such as flow control instructions and other instructions) executable by one or more processors to perform operations (such as flow control operations). An operator can set the flow rates and the valve open or close positions for all flow control systems distributed across the facility using the control system and/or a liquid level sensor for the evaporator 116. In such embodiments, the operator can manually change the flow conditions by providing inputs through the control system. Also, in such embodiments, the control system can automatically (that is, without manual intervention) control one or more of the flow control systems, for example, using feedback systems connected to the control system. For example, a sensor (such as a pressure sensor, temperature sensor or other sensor) can be connected to a pipe through which a fluid flows. The sensor can monitor and provide a flow condition (such as a pressure, temperature, or other flow condition) of the process stream to the control system. In response to the flow condition exceeding a threshold (such as a threshold pressure value, a threshold temperature value, or other threshold value), the control system can automatically perform operations. For example, if the pressure or temperature in the pipe exceeds the threshold pressure value or the threshold temperature value, respectively, the control system can provide a signal to the pump to decrease a flow rate, a signal to open a valve to relieve the pressure, a signal to shut down process stream flow, or other signals.

Figure 2:
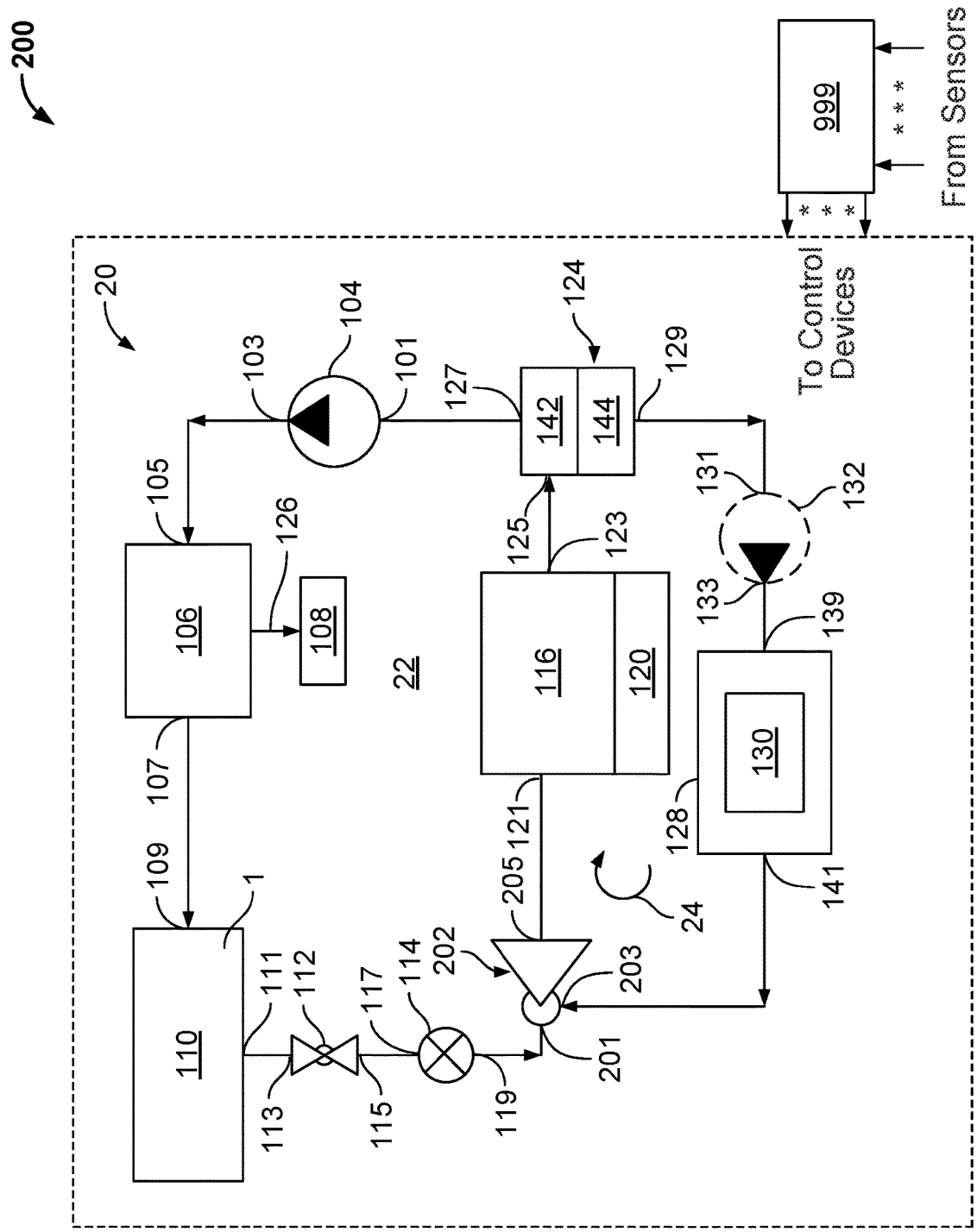

Referring to FIG. 2, an example of a thermal management system (TMS) 200 is shown to include a vapor cycle system (VCS) 22 and an ejector assist circuit 24 that are arranged in a closed-circuit refrigeration system (CCRS) 20. Components shown in the TMS 200 that are also included in TMS 100 generally have the same structure and function as described with reference to FIG. 1. In some aspects, although not shown, the oil circuit from FIG. 1 can be implemented in FIG. 2 as well.

As shown, the ejector 202 has a primary (motive) inlet 201, an outlet 205, and a secondary (suction) inlet 203. In some aspects, the ejector 202 is more effective in transcritical operation of the VCS 22 rather than in sub-critical operation of the VCS 22; however, ejector 202 can be used for sub-critical operation of VCS 22, as well. As shown, the locations of TES 128 and evaporator 116 are switched as compared to FIG. 1, since the temperature of the refrigerant liquid at the secondary inlet 203 would be lower (as compared to a configuration in which the locations of the TES 128 and evaporator 116 were as shown in a single TES implementation of TMS 100). Further, open-circuit configurations (discussed below) are generally not used with transcritical operation of the VCS 22.

As noted, the ejector 202 includes the primary inlet 201, the secondary or suction inlet 203, and the outlet 205. The primary inlet 201 feeds a motive nozzle, the secondary or suction inlet 203 feeds one or more secondary nozzles that are coupled to a suction chamber. A mixing chamber of a constant area receives the primary flow of refrigerant and secondary flow of refrigerant and mixes these flows. A diffuser diffuses the flow to deliver an expanded flow at the outlet 205. Liquid refrigerant from the receiver 110 is the primary flow. In a motive nozzle, potential energy of the primary flow at the inlet 201 is converted into kinetic energy reducing the potential energy (the established static pressure) of the primary flow. The secondary flow at the secondary inlet 203 from the outlet 141 of the TES 128 has a pressure that is higher than an established static pressure in the suction chamber, and thus the secondary flow is entrained through the suction inlet (secondary inlet 203) and the secondary nozzles internal to the ejector 202. The two streams (primary flow and secondary flow) mix together in a mixing section. In a diffuser section, the kinetic energy of the mixed streams is converted into potential energy elevating the pressure of the mixed flow liquid/vapor refrigerant that leaves the ejector outlet 205 and is fed to the liquid separator inlet 121 of the evaporator 116.

The use of the ejector 202 can allow for recirculation of liquid refrigerant captured by the liquid separator 124 to increase the efficiency of the TMS 200 (e.g., relative to a non-ejector system). That is, by allowing some passive recirculation of refrigerant liquid, apart from the operation of the compressor 104 and the condenser 106 as in a conventional closed-circuit refrigeration system, this passive recirculation reduces the required amount of refrigerant fluid needed for a given amount of cooling over a given period of operation and can also reduce both the power and size requirements for the compressor 104 and condenser 106 for a given amount of cooling capacity over a given period of operation.

In some aspects, TMS 200 can be modified to a transcritical system (e.g., typically when carbon dioxide is the refrigerant fluid 1) in which the condenser 106 operates as a gas cooler, and the solenoid valve 112 and expansion valve 114 may not be included. In such a modified configuration, the outlet 107 of the condenser 106 (as a gas cooler) can be fluidly coupled to the primary inlet 201 of the ejector 204 (with, e.g., a throttling valve and flash separator disposed therebetween, with flash gas provided to one or more transcritical compressors). In such a configuration, in some aspects, the pump 132 can also be optional and removed from ejector boost circuit 24. In such aspects, the ejector 204 can operate as a booster compressor and help compressor 104 (or two sets of compressors in a transcritical booster system) compress the refrigerant vapor. However, elimination of the pump 132 may also depend on a pressure drop across the combination of the evaporator 116 and TES 128. For example, the greater the pressure drop (e.g., longer distances between the evaporator 116 and TES 128 and/or larger pressure drops across such components), the more need there can be for addition of the pump 132 to properly circulate refrigerant fluid through one or both of the evaporator 116 and TESS 128 and to provide motive fluid to the ejector 204.

In this example implementation of TMS 200 including VCS 22, the VCS 22 can operate in three operational modes (in subcritical operation, such as with ammonia): (1) a TES cooling mode; (2) a heat load cooling mode; and (3) a pump-down mode.

In the TES cooling mode, the pump 132 is in the "ON" state and the low heat load 120 is "OFF." The ejector assist circuit 24 operates to "charge" the TES 128 and more particularly, cool (e.g., freeze) the PCM 130 in the TES 128 by directing refrigerant from the liquid-side outlet 129 though the TES 128. Cooling energy from the refrigerant is stored in the PCM 130 in latent heat form. The compressor 104 induces vapor from the vapor-side outlet 127 of the liquid separator 124 at a low pressure and compresses it to a high pressure. The vapor that is at the high pressure and temperature is cooled in the condenser 106. In this embodiment the VCS 22 is transcritical and the condenser 106 operates as a gas cooler. (If the VCS operation is subcritical, the condenser 106 operates as a condenser. When operating as a condenser, the vapor is de-superheated, condensed, and subcooled.)

Cooled, high pressure vapor refrigerant from the condenser 106 (acting as a gas cooler) enters the receiver 110. In the expansion valve 114, the refrigerant at the high pressure is iso-enthalpically expanded to the low pressure. The refrigerant fluid is fed to the primary inlet 201 of the ejector 202. The more the PCM 130 freezes, the less the heat load will be on the refrigerant in the TES 128, and at the same time the evaporator 116 generates less vapor for the compressor 104 to pump. The equilibrium between the compressor 104 and the reduced amount of formed vapor results in a reduced suction pressure, evaporating pressure, and evaporating temperature.

The expansion valve 114 can be configured to generate a superheat or vapor quality at the evaporator 116 outlet. The solenoid valve 112 and the expansion valve 114 are opened to charge the liquid separator 124 with liquid refrigerant. The receiver 110 (when used) and in the liquid separator 124 are configured to manage liquid refrigerant charge moving from the receiver 110 to the liquid separator 124. The receiver 110 contains a sufficient amount of refrigerant liquid and the volume of the liquid separator 124 is configured to accommodate all non-evaporated liquid.

In the heat load cooling mode, the low heat load 120 is ON, meaning that the low heat load 120 is operational and is generating heat that is removed by the evaporator 116. The operation of the low heat load 120 causes the ejector assist circuit 24 to engage and to cool the low heat load 120 by discharging the stored cooling energy from the PCM 130. The ejector assist circuit 24 is configured to evaporate refrigerant at a temperature that is below the heat load temperature low limit, in order to satisfy the heat load temperature tolerances and the heat transfer rate generated by a temperature differential, and above the freezing temperature of PCM 130 to enable operation of the TES 128 with condenser 106 (acting as a condenser).

It can be important to prevent cavitation in the pump 132. To avoid cavitation, the liquid at the pump inlet 131 is subcooled by maintaining a net positive suction head. Subcooling generated in the TES 128 and/or hydrostatic pressure of the liquid column in the liquid separator 124 contribute to developing the net positive suction head.

The heat load cooling mode may start operation either while the compressor 104 is OFF or while the compressor 104 continues to operate. If the TES 128 generates subcooling at the outlet 141, then the compressor 104 can be shut down. The subcooled liquid generated at the outlet 141 enters the secondary inlet 203 of the ejector 202, and the ejector assist circuit 24 operates as a regular closed-circuit pumping system. If the TES 128 generates a vapor quality at the exit, then the vapor/liquid refrigerant is fed to the liquid separator 124 and the vapor portion of the vapor/liquid refrigerant exits from the vapor-side outlet 127 and feeds the inlet 101 of the compressor 104.

In the heat load cooling mode, the VCS 22 and the ejector assist circuit 24 circuits may operate simultaneously. In this case, the compressor 104 continues to operate in the heat load cooling mode, as well. This operation allows the overall TES 128 cooling capacity to increase and/or extends the cooling period. When the PCM 130 melts and the stored thermal energy depletes the low heat load 120 cooling mode is over.

The heat load cooling mode may not require active control of the thermodynamic state at the evaporator outlet 123. In some aspects, the pump 132 may be configured to generate at the evaporator exit a vapor quality below the critical vapor quality under all operating conditions. The pumping capacity and the exit vapor quality are related. That is, if the pumping capacity is too low, the pumping flow rate that results causes higher vapor quality, which may exceed the critical vapor quality. On the other hand, if the pumping capacity is too high, the pumping flow rate reduces the exit vapor quality, but requires higher parasitic pumping power and elevates the risk of cavitation.

However, generally the liquid pumping power is very low thus the parasitic load on the TES 128 is not significant. Therefore, there is a significant amount of pumping flow rate increase that is possible to maintain exit vapor quality low enough under conditions of the entire operating envelope, while avoiding the higher parasitic pumping power or elevating the risk of cavitation. Alternatively, the pump 132 may be configured to generate a superheat at the outlet 123.

In the pump-down mode of VCS 22, the liquid accumulated in the liquid separator 124 is returned to the receiver 110. In the pump-down mode, the low heat load 120 is OFF, the pump 132 is OFF, the optional solenoid valve 112 and/or the expansion valve 114 are closed and the compressor 104 is ON. The compressor 104 drives vapor from the liquid separator 124 and returns it to the receiver 110 via the condenser 106 (operating as a condenser) by condensing the compressed vapor outputted by the compressor 104. During compressor operation, the pressure in the liquid separator 124 is reduced, the evaporating temperature is reduced, and refrigerant evaporates generating new portions for the compressor 104 to compress. Various indicators can be used to show that the receiver 110 is full as described previously. When the pump-down is completed, the VCS 22 executes the TES cooling mode again and gets ready to again cool the low heat load 120.

In a transcritical configuration of TMS 200, the operation of the ejector assist circuit 24 can be largely as previously described, with the exception of the removal of the pump 132 in some configurations (e.g., depending on refrigerant type (ammonia) and/or pressure drop across the evaporator 116 and/or TES 128). In configurations without pump 132, the ejector 202 circulates the refrigerant fluid through the ejector assist circuit 24 alone. Further, as described, the condenser 106 (as a gas cooler) would output an undefined mixture of liquid and vapor refrigerant, likely to a flow control device and then flash gas separator upstream of the ejector assist circuit 24. Flash gas would be returned through a separate conduit (not shown) to inlet 101 of the compressor 104. Separated liquid would then be circulated to, e.g., expansion valve 114 prior to entering the inlet 201 of the ejector 204.

Figure 3:
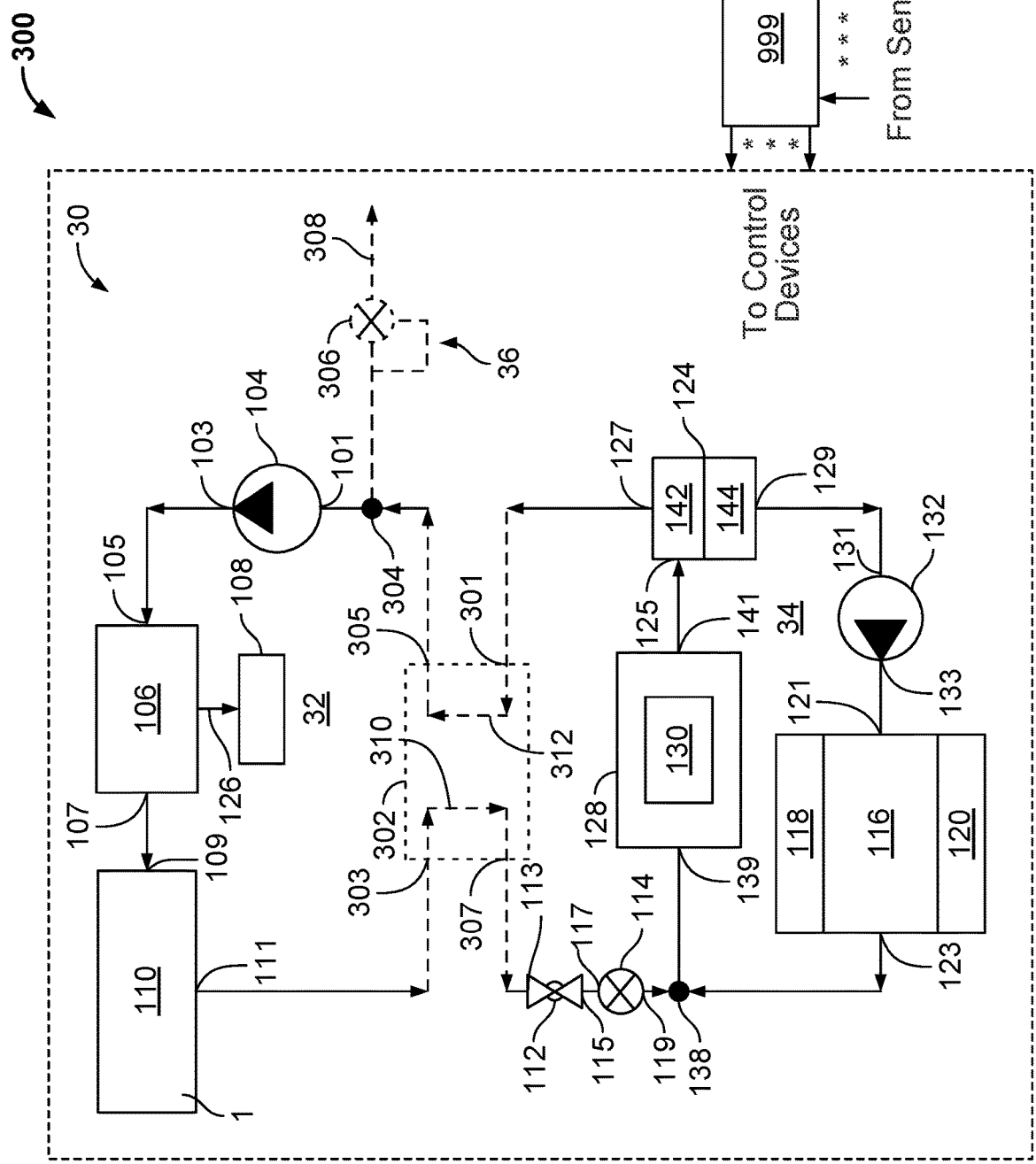

Referring to FIG. 3, an example of a thermal management system (TMS) 300 is shown to include a vapor cycle system (VCS) 32, as well as an optional recuperative heat exchanger 302, as well as an optional open-circuit refrigeration system (OCRS) 36 that is arranged in or with a closed-circuit refrigeration system (CCRS) 30. Components shown in the TMS 300 that are also included in TMS 100 or TMS 200 generally have the same structure and function as described with reference to FIG. 1 or FIG. 2. In some aspects, although not shown, the oil circuit from FIG. 1 can be implemented in FIG. 3 as well.

Generally, TMS 300 can be implemented similarly to TMS 100 but modified to include one or both of the recuperative heat exchanger 302 and optional OCRS 36. Thus, in some aspects, TMS 300 includes only optional recuperative heat exchanger 302. In some aspects, TMS 300 includes only optional OCRS 36. In some aspects, TMS 300 includes both recuperative heat exchanger 302 and OCRS 36. In some aspects, therefore, the CCRS 30 can be integrated with OCRS 36 to provide an open-circuit refrigerant integrated with a closed-circuit refrigerant that further extends the cooling capabilities of the TMS 300 after the stored cooling energy in the PCM(s) 130 is depleted.

Regarding optional OCRS 33, this optional circuit includes receiver 110, the solenoid valve 112, the expansion valve 114, the TES 128, the evaporator 116, the liquid separator 124, a junction 304, and a flow control device 306 positioned in exhaust 308. In some aspects, the flow control device 306 can be a back-pressure regulator 306. As further shown, in this example, the evaporator 116 is configured to cool low heat load 120 and a high heat load 118 (e.g., a relatively high heat load over relatively short-time intervals). High heat load 118 can be generated by highly temperature sensitive components, relative to more temperature insensitive components that typify low heat loads 120. During operation of the optional OCRS 33, the OCRS 36 discharges refrigerant vapor via the exhaust 308, with the discharged refrigerant vapor not being returned to the receiver 110 (e.g., directly).

The back-pressure regulator 306 generally functions to control the fluid pressure upstream of the back-pressure regulator 306. In optional OCRS 33, the back-pressure regulator 306 controls the refrigerant fluid pressure upstream from the evaporator 116 and back-pressure regulator 306. A back-pressure regulator (BPR) is a device that regulates fluid pressure upstream from the regulator. In general, a wide range of different mechanical and electrical/electronic devices can be used as back-pressure regulator 306. Typically, mechanical back-pressure regulating devices have an orifice and a spring supporting a moving seat against the pressure of the refrigerant fluid stream. The moving seat adjusts the cross-sectional area of the orifice and the refrigerant fluid volume and mass flow rates. Typical electrical back-pressure regulating devices include an orifice, a moving seat, a motor or actuator that changes the position of the seat in respect to the orifice, a control system 999, and a pressure sensor at the evaporator exit or at the valve inlet. If the refrigerant fluid pressure is above a set-point value, the seat moves to increase the cross-sectional area of the orifice and the refrigerant fluid volume and mass flow rates to re-establish the set-point pressure value. If the refrigerant fluid pressure is below the set-point value, the seat moves to decrease the cross-sectional area and the refrigerant fluid flow rates. In general, back-pressure regulators are selected based on the refrigerant fluid volume flow rate, the pressure differential across the regulator, and the pressure and temperature at the regulator inlet. Examples of suitable commercially available back-pressure regulators that can function as the back-pressure regulator 306 include, but are not limited to, valves available from the Sporlan Division of Parker Hannifin Corporation (Washington, Mo.) and from Danfoss (Syddanmark, Denmark).

As shown in FIG. 3, recuperative heat exchanger 302 includes inlet 303 that is fluidly coupled to outlet 111 of the receiver 110. The recuperative heat exchanger 302 includes inlet 301 that is fluidly coupled to outlet 127 of the liquid separator 124. The recuperative heat exchanger 302 includes outlet 307 that is fluidly coupled to inlet 113 of the optional solenoid valve 112. The recuperative heat exchanger 302 includes outlet 305 that is fluidly coupled to junction 304 (and thus inlet 101 of the compressor 104 and the optional OCRS 33 at exhaust 308). The recuperative heat exchanger 302 includes a first fluid path 310 and a second fluid path 312. The recuperative heat exchanger 302 can be used for transcritical operation of the VCS 32. The recuperative heat exchanger 302, as shown, has a first path coupled between the outlet 111 of the receiver 110 and the expansion valve 114 and a second path coupled between the vapor-side outlet 127 of liquid separator 124 and the junction 304. The recuperative heat exchanger 302 transfers heat energy from the refrigerant fluid 1 emerging from liquid separator 124 to refrigerant fluid 1 upstream from expansion valve 114. Inclusion of the recuperative heat exchanger 302 can reduce mass flow rate demand and allows operation of evaporator 116 within a threshold of vapor quality.

The recuperative heat exchanger 302 provides thermal contact between the liquid refrigerant leaving the receiver 110 and the refrigerant vapor from the liquid separator 124. The use of the recuperative heat exchanger 302, at the outlet of the receiver 110, may further reduce liquid refrigerant mass flow rate demand from the receiver 110 by re-using the enthalpy of the exhaust vapor to precool the PCM 130 in TES 128 to reduce the enthalpy of the refrigerant fluid entering the TES 128, and thus reducing mass flow rate demand, providing a relative increase in energy efficiency of TMS 300.

In configurations in which TMS 300 does not include the recuperative heat exchanger 302, then the outlet 111 of the receiver 110 can be fluidly coupled to inlet 113 of the solenoid valve 112. Further, the outlet 127 of the liquid separator 124 can be fluidly coupled to junction 304.

When TMS 300 includes the OCRS 36 but not the recuperative heat exchanger 302, then a cooling operation of the TMS 300 can be initiated by a variety of different mechanisms. In some embodiments, for example, a temperature sensor can be attached to the low heat load 120 and/or high heat load 118. When the temperature of either low heat load 120 and/or high heat load 118 exceeds a certain temperature set point (i.e., threshold value), the control system 999 connected to the temperature sensor can initiate cooling of the respective low heat load 120 by the CCRS 30 or cooling of the high heat load 118 by the OCRS 36. Another mechanism is when the PCM 130 is melted and the stored cooling energy in the PCM 130 is depleted. Alternatively, in certain embodiments, optional OCRS 33 operates essentially continuously—provided that the pressure within receiver 110 is sufficient—to cool high heat load 118.

Upon initiation of a cooling operation, refrigerant fluid 1 from receiver 110 is discharged from the outlet 111 and through solenoid valve 112 (if present). The driving force for the transport of refrigerant fluid 1 through OCRS 36 is the pressure within receiver 110. As refrigerant fluid 1 leaves receiver 110, it is transported to the expansion valve 114, which directly or indirectly controls vapor quality at the evaporator outlet 123.

Once inside the expansion valve 114, the refrigerant fluid 1 undergoes constant enthalpy expansion from an initial pressure $p_r$ (i.e., the receiver pressure) to an evaporation pressure $p_e$ at the outlet 123 of the expansion valve 114. In general, the evaporation pressure $p_e$ depends on a variety of factors, most notably the desired temperature set point value (i.e., the target temperature) at which high heat load 118 is to be maintained and/or the heat input generated by the low heat load 120.

The initial pressure in the receiver 110 tends to be in equilibrium with the surrounding temperature and is different for different refrigerant fluids. The pressure in the evaporator 116 depends on the evaporating temperature, which is lower than the heat load temperature and is defined during design of the TMS 300. The system is operational as long the receiver-to-evaporator pressure difference is sufficient to drive adequate refrigerant fluid flow through the expansion valve 114.

After undergoing constant enthalpy expansion in the expansion valve 114, the liquid refrigerant fluid is converted to a mixture of liquid and vapor phases at the temperature of the fluid and evaporation pressure $p_e$. The two-phase refrigerant fluid mixture is transported to evaporator 116. When the two-phase mixture of refrigerant fluid is directed into evaporator 116, the liquid phase absorbs heat from high heat load 118, driving a phase transition of the liquid refrigerant fluid into the vapor phase. Because this phase transition occurs at (nominally) constant temperature, the temperature of the refrigerant fluid mixture within evaporator 116 remains unchanged, provided at least some liquid refrigerant fluid remains in evaporator 116 to absorb heat.

Further, the constant temperature of the refrigerant fluid mixture within evaporator 116 can be controlled by adjusting the pressure $p_e$ of the refrigerant fluid, since adjustment of $p_e$ changes the boiling temperature of the refrigerant fluid. Thus, by regulating the refrigerant fluid pressure $p_e$ upstream from evaporator 116 (e.g., using back-pressure regulator 306), the temperature of the refrigerant fluid within evaporator 116 (and, nominally, the temperature of high heat load 118) can be controlled to match a specific temperature set-point value for high heat load 118, ensuring that high heat load 118 is maintained at, or very near, a target temperature. The low heat load 120 is likewise cooled by refrigerant received from the pump outlet.

The pressure drop across the evaporator 116 may cause a drop of the temperature of the refrigerant mixture (which is the evaporating temperature), but still the evaporator 116 can be configured to maintain the heat load temperature within in the set tolerances.

In some embodiments, for example, the evaporation pressure of the refrigerant fluid can be adjusted by the back-pressure regulator 306 to ensure that the temperature of high heat load 118 is maintained to within ±5 degrees C. (e.g., to within ±4 degrees C., to within ±3 degrees C., to within ±2 degrees C., to within ±1 degree C.) of the temperature set point value for high heat load 118.

As discussed above, within evaporator 116, a portion of the liquid refrigerant in the two-phase refrigerant fluid mixture is converted to refrigerant vapor by undergoing a phase change. As a result, the refrigerant fluid mixture that emerges from evaporator 116 has a higher vapor quality (i.e., the fraction of the vapor phase that exists in refrigerant fluid mixture) than the refrigerant fluid mixture that enters evaporator 116. As the refrigerant fluid mixture emerges from evaporator 116, a portion of the refrigerant fluid can optionally be used to cool one or more additional heat loads 120. Typically, for example, the refrigerant fluid that emerges from evaporator 116 is nearly in the vapor phase. The refrigerant fluid vapor (or, more precisely, high vapor quality fluid vapor) can be directed into a heat exchanger coupled to another low heat load 120 and can absorb heat from the additional low heat load 120 during propagation through the evaporator 116. Examples of systems in which the refrigerant fluid emerging from evaporator 116 is used to cool additional thermal loads 120 will be discussed in more detail subsequently.

The refrigerant fluid emerging from evaporator 116 is transported to the compressor inlet 101 and the back-pressure regulator 306 inlet, via the junction 304. The set point pressure at the inlet of the back-pressure regulator 306 controls the portion of the refrigerant stream that is discharged and the portion that is compressed. The back-pressure regulator 306 also directly or indirectly controls the upstream pressure, that is, the evaporating pressure $p_e$ in the system. After passing a portion of the refrigerant vapor through back-pressure regulator 306, the refrigerant fluid is discharged through the exhaust 38. Refrigerant fluid discharge can occur directly into the environment surrounding optional OCRS 33. Alternatively, in some embodiments, the refrigerant fluid can be further processed; various features and aspects of such processing are discussed in further detail below.

It should be noted that the foregoing steps, while discussed sequentially for purposes of clarity, occur simultaneously and continuously during cooling operations. In other words, refrigerant fluid is continuously being discharged from receiver 110, undergoing continuous expansion in expansion valve 114, flowing continuously through evaporator 116 and back-pressure regulator 306, and being discharged from optional OCRS 33, while high heat load 118 is being cooled.

As discussed in the previous section, by adjusting the pressure $p_e$ of the refrigerant fluid, the temperature at which the liquid refrigerant phase undergoes vaporization within evaporator 116 can be controlled. Thus, in general, the temperature of high heat load 118 can be controlled by a device or component of optional OCRS 33 that regulates the pressure of the refrigerant fluid within evaporator 116. Typically, the back-pressure regulator 306 adjusts the upstream refrigerant fluid pressure in OCRS 36. Accordingly, back-pressure regulator 306 is generally configured to control the temperature of high heat load 118 and can be adjusted to selectively change a temperature set point value (i.e., a target temperature) for high heat load 118.

Another important system operating parameter is the vapor quality of the refrigerant fluid emerging from evaporator 116. The vapor quality, which is a number from 0 to 1, represents the fraction of the refrigerant fluid that is in the vapor phase. Because heat absorbed from high heat load 118 is used to drive evaporation of liquid refrigerant to form refrigerant vapor in evaporator 116, it is generally important to ensure that, for a particular volume of refrigerant fluid propagating through evaporator 116, at least some of the refrigerant fluid remains in liquid form right up to the point at which the exit aperture of evaporator 116 is reached to allow continued heat absorption from high heat load 118 without causing a temperature increase of the refrigerant fluid. If the fluid is fully converted to the vapor phase after propagating only partially through evaporator 116, further heat absorption by the now vapor-phase refrigerant fluid within evaporator 116 will lead to a temperature increase of the refrigerant fluid and high heat load 118. Even before all refrigerant fluid is converted to the vapor phase, if the temperature of the refrigerant fluid increases, further heat absorption by the two-phase refrigerant fluid mixture can occur at a vapor quality that is above the critical vapor quality that drives the evaporation process in a portion of evaporator 116.

On the other hand, liquid-phase refrigerant fluid that emerges from evaporator 116 represents unused heat-absorbing capacity, in that the liquid refrigerant fluid did not absorb sufficient heat from high heat load 118 to undergo a phase change. To ensure that optional OCRS 33 operates efficiently, the liquid is captured by the liquid separator 124 and recirculated via pump 132 as shown.

In addition, the boiling heat transfer coefficient that characterizes the effectiveness of heat transfer from high heat load 118 to the refrigerant fluid 1 is typically very sensitive to vapor quality. When the vapor quality increases from zero to a certain value, called a critical vapor quality, the heat transfer coefficient increases. When the vapor quality exceeds the critical vapor quality, the heat transfer coefficient is abruptly reduced to a very low value, causing dryout within evaporator 116. In this region of operation, the two-phase mixture behaves as superheated vapor.

In general, the critical vapor quality and heat transfer coefficient values vary widely for different refrigerant fluids, and heat and mass fluxes. For all such refrigerant fluids and operating conditions, the systems and methods disclosed herein control the vapor quality at the outlet of the evaporator 116 such that the vapor quality approaches the threshold of the critical vapor quality. The use of the liquid separator 124 captures liquid that is recirculated by the pump 132 allowing operation at lower a vapor quality.

To make maximum use of the heat-absorbing capacity of the two-phase refrigerant fluid mixture when operating in the open-circuit mode, the vapor quality of the refrigerant fluid emerging from evaporator 116 is less than the critical vapor quality and avoids the dryout and mist regions. Accordingly, to both efficiently use the heat-absorbing capacity of the two-phase refrigerant fluid mixture and also ensure that the temperature of high heat load 118 remains approximately constant at the phase transition temperature of the refrigerant fluid in evaporator 116, the systems and methods disclosed herein are generally configured to adjust the vapor quality of the refrigerant fluid emerging from evaporator 116 to a value that is less than the critical vapor quality, with any liquid subsequently captured by the liquid separator 124 and recirculated by the pump 132.

Another important operating consideration for OCRS 36 is the mass flow rate of refrigerant fluid within the OCRS 36. Evaporator 116 can be configured to provide minimal mass flow rate controlling maximal vapor quality, which is below the critical vapor quality. By minimizing the mass flow rate of the refrigerant fluid according to the cooling requirements for high heat load 118, OCRS 36 operates efficiently. Each reduction in the mass flow rate of the refrigerant fluid (while maintaining the same temperature set point value for high heat load 118) means that the charge of refrigerant fluid added to receiver 110 initially lasts longer, providing further operating time for OCRS 36.

Within evaporator 116, the vapor quality of a given quantity of refrigerant fluid varies from the evaporator inlet (where vapor quality is lowest) to the evaporator outlet (where vapor quality is highest). Nonetheless, to realize the lowest possible mass flow rate of the refrigerant fluid within the system, the effective vapor quality of the refrigerant fluid within evaporator 116, even when accounting for variations that occur within evaporator 116, should match the critical vapor quality as closely as possible, with any liquid subsequently captured by the liquid separator 124 and recirculated by the pump 132.

In summary, to ensure that OCRS 36 operates efficiently and the mass flow rate of the refrigerant fluid is relatively low, and at the same time the temperature of high heat load 118 is maintained within a relatively small tolerance, OCRS 36 adjusts the vapor quality of the refrigerant fluid emerging from evaporator 116 to a value such that an effective vapor quality within evaporator 116 is less than the critical vapor quality.

In OCRS 36, expansion valve 114 is generally configured to control the vapor quality of the refrigerant fluid emerging from evaporator 116. As an example, when expansion valve 114 is implemented as an expansion valve, the expansion valve regulates the mass flow rate of the refrigerant fluid through the valve. In turn, for a given set of operating conditions (e.g., ambient temperature, initial pressure in the receiver 110, temperature set point value for high heat load 118), the vapor quality determines mass flow rate of the refrigerant fluid emerging from evaporator 116. While expansion valve 114 typically controls the vapor quality of the refrigerant fluid emerging from evaporator 116 in response to information about at least one thermodynamic quantity that is either directly or indirectly related to the vapor quality, back-pressure regulator 306 typically adjusts the temperature of high heat load 118 (via upstream refrigerant fluid pressure adjustments) in response to information about at least one thermodynamic quantity that is directly or indirectly related to the temperature of high heat load 118. The one or more thermodynamic quantities upon which adjustment of expansion valve 114 is based are different from the one or more thermodynamic quantities upon which adjustment of back-pressure regulator 306 is based.

In implementations of TMS 300 that include the recuperative heat exchanger 302, the TMS 300 can operate as a transcritical system. In some aspects, such implementations may not include the OCRS 36. Further, in such aspects, the receiver 110 may not be needed o included (e.g., due to the receiver 110 acting as a gas cooler with no phase change of the refrigerant vapor leaving compressor 104 there within). In some aspects, refrigerant fluid 1 is carbon dioxide in such configurations. Other refrigerants could be used.

In these example configuration using recuperative heat exchanger 302, in cooling mode, the pump 132 may be ON or OFF. The compressor 104 compresses vapor at the vapor-side outlet 127 of the liquid separator 124 and discharges the compressed high-pressure vapor into the condenser 106 (operating as a gas cooler). The compressed vapor is cooled in the condenser 106, and is further cooled by the recuperative heat exchanger 302 (without passing through a receiver) from the refrigerant vapor that exits the vapor-side outlet 127. The refrigerant vapor that exits recuperative heat exchanger 302 is enthalpically expanded by the expansion valve 114. After the expansion, the two phase mixture and the mixture from the evaporator outlet enters junction 138 and is output to the TES 128 (e.g., to cool, such as freeze, PCM 130) and evaporates. When the PCM 130 freezes, the load on the evaporating refrigerant is reduced and the non-evaporated refrigerant is collected in the liquid separator 124. The liquid separator 124 is configured to accommodate all of the non-evaporated refrigerant.

LPS 34 is engaged to cool the high heat load 118 by discharging the stored cooling energy from the PCM 130. During heat transfer, the LPS 34 is engaged. During operation, the refrigerant collected in the liquid separator 124 evaporates in the evaporator 116 and is returned to the VCS 32. No pump-down cycle may be required.

Figure 4:
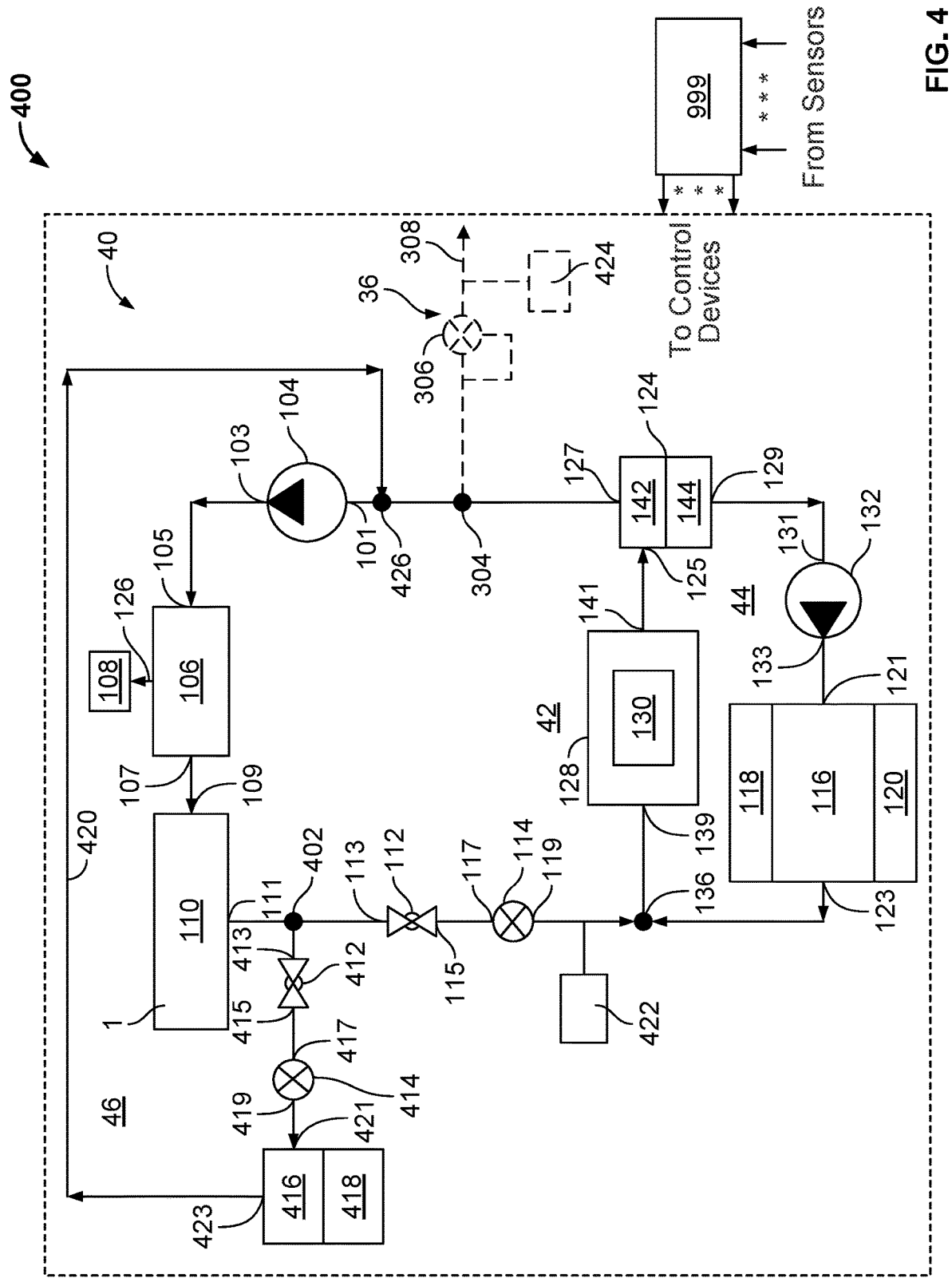

Referring to FIG. 4, an example of a thermal management system (TMS) 400 is shown to include a vapor cycle system (VCS) 42 arranged in or with a closed-circuit refrigeration system (CCRS) 40, as well as an LPS 44. Components shown in the TMS 400 that are also included in TMS 100, TMS 200, or TMS 300 generally have the same structure and function as described with reference to FIGS. 1-3. In some aspects, although not shown, the oil circuit from FIG. 1 can be implemented in FIG. 4 as well.

As illustrated, TMS 400 can also include a secondary cooling loop 46 that includes junction 402 fluidly coupled between outlet 111 and inlet 113, an optional solenoid valve 412 having an inlet 413 (coupled to junction 402) and an outlet 415, an optional expansion valve 414 having an inlet 417 and outlet 419, and an evaporator 416 with an inlet 421 and an outlet 423, each of which is disposed in conduit 420 that connects to a junction 426 between junction 304 and inlet 101 of compressor 104. In this example, a heat load 418 (e.g., a high temperature heat load) is in thermal conductive or convective contact or in proximity with the evaporator 416.

As further shown in FIG. 4, sensors 422 and 444 can be positioned in the TMS 400. Sensor 422 is positioned between outlet 119 and junction 136. Sensor 424 is positioned in exhaust 308.

As shown, the evaporator 416 receives refrigerant fluid 1, via the expansion valve 414 and optional solenoid valve 412, from the receiver outlet 111. Refrigerant fluid 1 is used to cool the high temperature heat load 418, e.g., without vapor quality control, to provide complete vapor at the outlet 423 of the evaporator 416, that is then fed to junction 426 (to either be exhausted in OCRS 36 (as described with reference to FIG. 3) or compressed by compressor 104).

By a high temperature, heat load 418 is meant that cooling is accomplished at a high temperature relative to the cooling temperature of low heat load 120 and/or high heat load 118. The receiver 110 and expansion valve 414 are configured to cool the high temperature heat load 418 at a temperature that is lower than the temperature used to cool heat loads 120, 118. That is, the low temperature heat load 120 is cooled by refrigerant fluid that is below the condensation temperature of the refrigerant vapor, whereas high temperature heat load 418 is cooled at a high temperature that is equal to or above the condensation temperature of the refrigerant vapor. Examples of high temperature heat loads 418 are batteries and various electronic and mechanical devices.

In this example implementation, expansion valve 114 is communicably coupled to sensor 422 and back-pressure regulator 306 is communicably coupled to sensor 424. The sensors 422, 424 provide information about the thermodynamic quantities upon which adjustments of these valves are based. The sensors 422, 424 can be implemented in many different ways, depending upon the nature of the valves. Such sensors, as well as other sensors, can be disposed in the TMS 100, 200 and/or 300 as necessary.

In operation, TMS 400 can operate in a TES cooling mode, a heat load cooling mode, and a pump-down mode (if necessary). Such modes are similar to those described with reference to TMS 300 (e.g., without recuperative heat exchanger 302). During a heat load cooling mode, solenoid valve 412 can be opened to allow refrigerant fluid from receiver 110 to also circulate to cool high temperature heat load 418 in evaporator 416 before either being exhausted through exhaust 308 or compressed by compressor 104. The back-pressure regulator 306 can be adjusted to control, e.g., the temperature of high heat load 118 and/or high temperature heat load 418 in response to information about at least one thermodynamic quantity that is directly or indirectly related to the temperature of such heat loads.

Figure 5A:
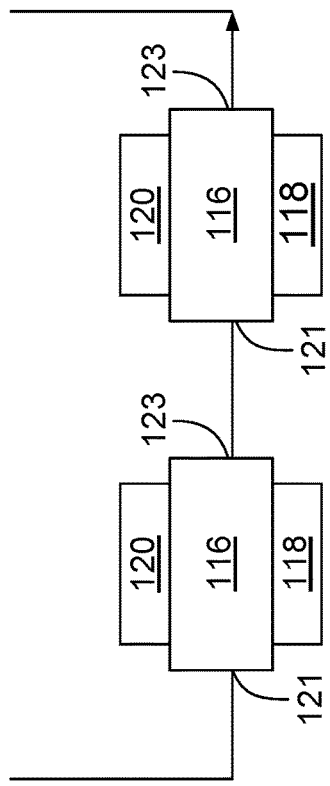
FIGS. 5A-5D are schematic diagrams that show alternative implementations of an evaporator configuration according to the present disclosure.
Figure 5B:
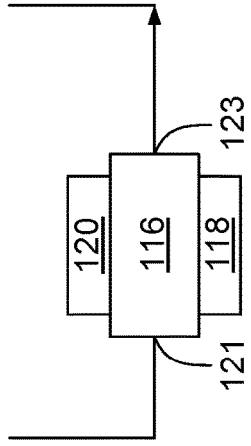
Figure 5D:
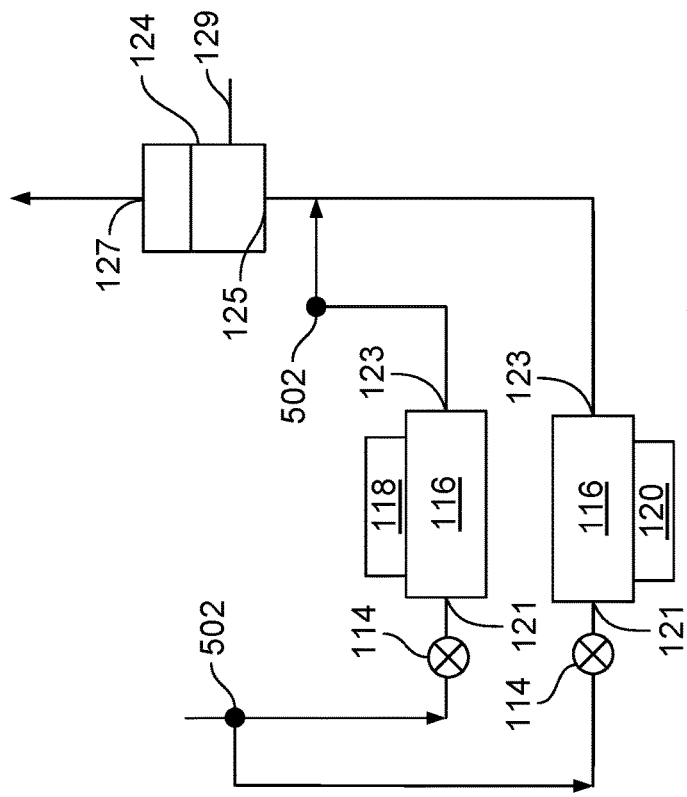
Figure 5C:
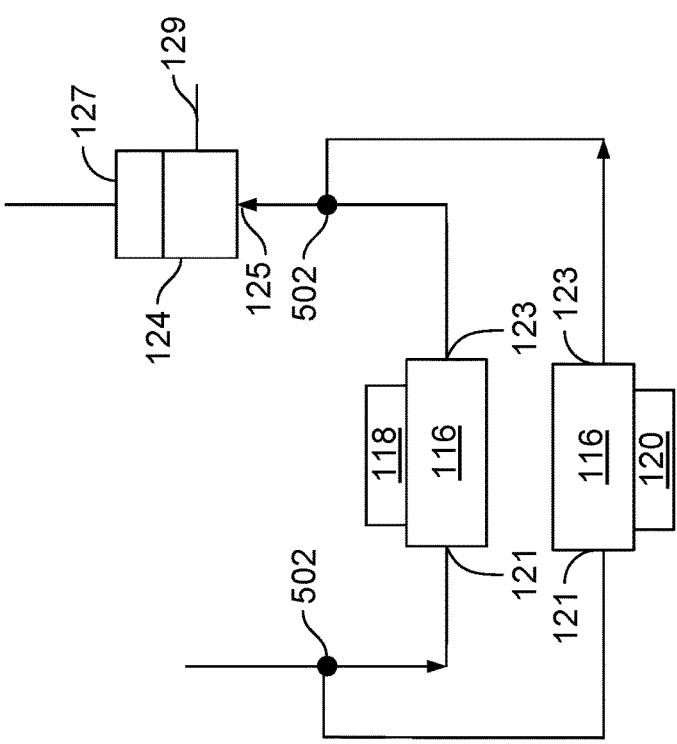

Referring now to FIGS. 5A-5D additional evaporator configurations that are alternative configurations of the evaporator 116 and heat loads 120, 118 are shown. In the configuration of FIG. 5A, both the low heat load 120 and the high heat load 118 are in thermal conductive and/or convective contact or are in proximity to a single, i.e., the same evaporator 116. In the configuration of FIG. 5B, each of a pair of series coupled evaporators 116 have the low heat load 120 and the high heat load 118 in thermal conductive and/or convective contact or are in proximity. In an alternative configuration of FIG. 5A, (not shown), the low heat load 120 would be coupled (or proximate) to a first one of the pair of evaporators 116 and the high heat load 118 would be coupled (or proximate) to a second one of the pair of evaporators 116. In the configurations of FIGS. 5C and 5D, the low heat load 120 and the high heat load 118 are thermally coupled to (or are in proximity to) corresponding ones of the pair of evaporators 116. In the configurations of FIGS. 5C and 5D, a first T-valve 502 (e.g., junction device either passive or active), as shown, combines refrigerant flow from the evaporators 116 into a single flow. One of these evaporators 116 is thermally coupled (or proximate to) the low heat load 120 and the other of these evaporators 116 is thermally coupled (or proximate to) the high heat load 118. Other configurations are possible. In the configuration of FIG. 5C, the outlets of the evaporators 116 are coupled via conduit to inlets of a second T-valve 502 (active or passive) that has an outlet that sends refrigerant to liquid-side inlet 125 of the liquid separator 124. On the other hand, in the configuration of FIG. 5D, the inlets of the evaporators 116 are coupled differently, through expansion devices 114.

Figure 6:
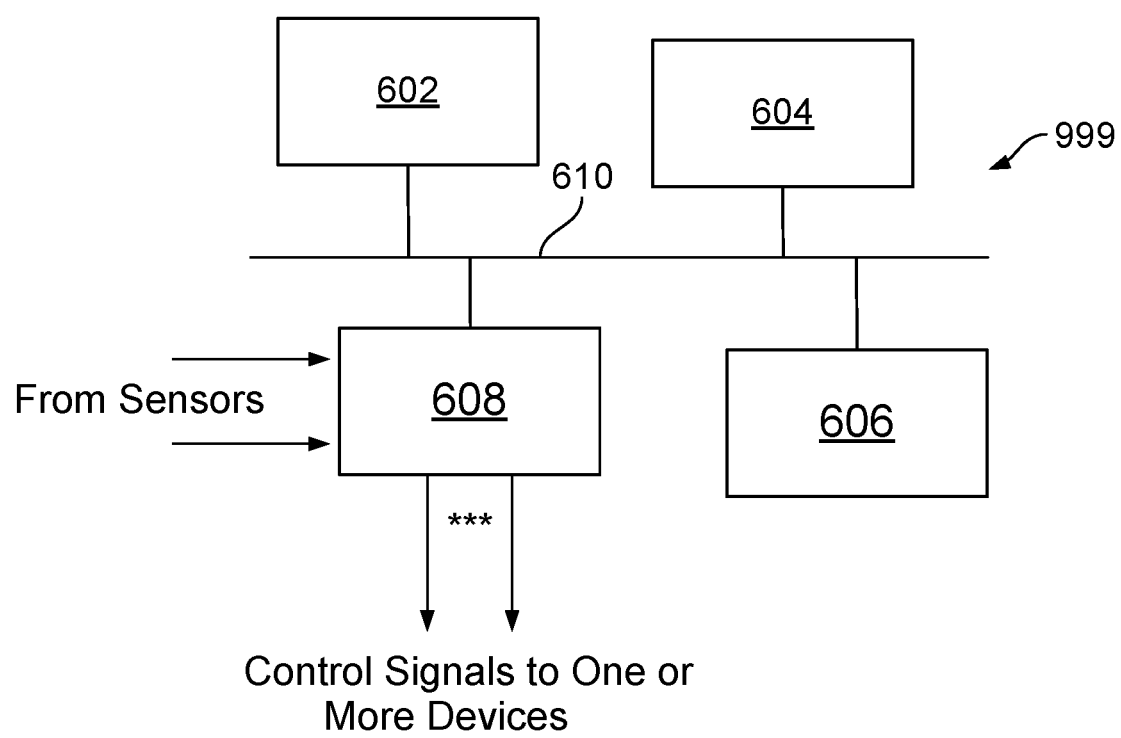
FIG. 6 is a block diagram of a control system or controller for a TMS according to the present disclosure.

Referring now to FIG. 6, control system 999 can generally be implemented as any one of a variety of different electrical or electronic computing or processing devices, and can perform any combination of the various steps discussed above to control various components of the disclosed thermal management systems.

Control system 999 generally includes a processor 602 (or multiple processors), a memory 604, a storage device 606, and input/output interfaces 608. Some or all of these components can be interconnected using a system bus 610. The processor 602 is capable of processing instructions for execution. In some embodiments, the processor 602 is a single-threaded processor. In certain embodiments, the processor 602 is a multi-threaded processor. Typically, the processor 602 is capable of processing instructions stored in the memory 604 or on the storage device 606 to display graphical information for a user interface on the input/output device, and to execute the various monitoring and control functions discussed above. Suitable processors for the systems disclosed herein include both general and special purpose microprocessors, and the sole processor or one of multiple processors of any kind of computer or computing device.

The memory 604 stores information within the control system 999, and can be a computer-readable medium, such as a volatile or non-volatile memory. The storage device can be capable of providing mass storage for the control system 999. In general, the storage device 606 can include any non-transitory tangible media configured to store computer readable instructions. For example, the storage device can include a computer-readable medium and associated components, including: magnetic disks, such as internal hard disks and removable disks; magneto-optical disks; and optical disks. Storage devices suitable for tangibly embodying computer program instructions and data include all forms of non-volatile memory including, by way of example, semiconductor memory devices, such as EPROM, EEPROM, and flash memory devices; magnetic disks such as internal hard disks and removable disks; magneto-optical disks; and CD-ROM and DVD-ROM disks. Processors and memory units of the systems disclosed herein can be supplemented by, or incorporated in, ASICs (application-specific integrated circuits).

The input/output interfaces 608 provide input/output operations for control system 999. In some embodiments, the input/output interfaces include a display unit for displaying graphical user interfaces and system related information.

The features described herein, including components for performing various measurement, monitoring, control, and communication functions, can be implemented in digital electronic circuitry, or in computer hardware, firmware, or in combinations of them. Methods steps can be implemented in a computer program product tangibly embodied in an information carrier, e.g., in a machine-readable storage device, for execution by a programmable processor (e.g., of control system 999), and features can be performed by a programmable processor executing such a program of instructions to perform any of the steps and functions described above. Computer programs suitable for execution by one or more system processors include a set of instructions that can be used directly or indirectly, to cause a processor or other computing device executing the instructions to perform certain activities, including the various steps discussed above.

Computer programs suitable for use with the systems and methods disclosed herein can be written in any form of programming language, including compiled or interpreted languages, and can be deployed in any form, including as stand-alone programs or as modules, components, subroutines, or other units suitable for use in a computing environment.

In addition to one or more processors and/or computing components implemented as part of control system 999, the systems disclosed herein can include additional processors and/or computing components within any of the control device (e.g., expansion valve 114) and any of the sensors discussed above. Processors and/or computing components of the control devices and sensors, and software programs and instructions that are executed by such processors and/or computing components, can generally have any of the features discussed above in connection with control system 999.

A variety of different refrigerant fluids can be used in a TMS as described herein. For open-circuit refrigeration systems, in general, emissions regulations and operating environments may limit the types of refrigerant fluids that can be used. For example, in certain embodiments, the refrigerant fluid can be ammonia having very large latent heat; after passing through the cooling circuit, the ammonia refrigerant can be disposed of by incineration, by chemical treatment (i.e., neutralization), and/or by direct venting to the atmosphere. In certain embodiments, the refrigerant fluid can be an ammonia-based mixture that includes ammonia and one or more other substances. For example, mixtures can include one or more additives that facilitate ammonia absorption or ammonia burning.

More generally, any fluid can be used as a refrigerant in the open-circuit refrigeration systems disclosed herein, provided that the fluid is suitable for cooling the low heat load 120 (e.g., the fluid boils at an appropriate temperature) and in embodiments where the refrigerant fluid is exhausted directly to the environment, regulations and other safety and operating considerations do not inhibit such discharge.

A TMS can include a number of different sensors besides 422 and/or 424. Each of the sensors is optional, and various combinations of the sensors can be used to measure thermodynamic properties and produce signals that are used to adjust flow control devices, back-pressure regulator 306, motor of the compressor 104, etc.

Optional pressure sensors can be coupled upstream and downstream from TES 128, respectively, and are configured to measure information about the pressure differential $p_r-p_e$ across TES 128, and transmit an electronic signal corresponding to the measured pressure difference information. While separate sensors are described, in certain embodiments the sensors can be replaced by a single pressure differential sensor. Where a pressure differential sensor is used, a first end of the sensor is connected upstream of TES 128 and a second end of the sensor is connected downstream from TES 128.

Optional pressure sensors can be coupled upstream and downstream from expansion valve 114, respectively, and are configured to measure information about the pressure differential $p_r-p_e$ across expansion valve 114, and transmit an electronic signal corresponding to the measured pressure difference information. While separate sensors are described, in certain embodiments the sensors can be replaced by a single pressure differential sensor. Where a pressure differential sensor is used, a first end of the sensor is connected upstream of expansion valve 114 and a second end of the sensor is connected downstream from expansion valve 114.

A TMS can also include optional pressure sensors positioned at the inlet and outlet, respectively, of evaporator 116. Sensor at the inlet measures and transmits information about the refrigerant fluid pressure upstream from evaporator 116, and sensor at the outlet measures and transmits information about the refrigerant fluid pressure downstream from evaporator 116. This information can be used (e.g., by the system control system 999) to calculate the refrigerant fluid pressure drop across evaporator 116. As above, in certain embodiments, the sensors can be replaced by a single pressure differential sensor, a first end of which is connected adjacent to the evaporator inlet and a second end of which is connected adjacent to the evaporator outlet. The pressure differential sensor measures and transmits information about the refrigerant fluid pressure drop across evaporator 116.

To measure the evaporating pressure ($p_e$), a sensor can be optionally positioned between the inlet and outlet of evaporator 116, i.e., internal to evaporator 116. In such a configuration, the sensor can provide a direct measurement of the evaporating pressure. To measure refrigerant fluid pressure at other locations within an OCRS, the sensor can also optionally be positioned at various locations within the system. For example, the sensor can be located in-line along conduit. Alternatively, the sensor can be positioned at or near an inlet of expansion valve 414. Pressure sensors at each of these locations can be used to provide information about the refrigerant fluid pressure downstream from evaporator 116, or the pressure drop across evaporator 116.

A TMS can include an optional temperature sensor which can be positioned adjacent to an inlet or an outlet of TES 128, or between the inlet and the outlet. Sensor measures temperature information for the refrigerant fluid within TES 128 and transmits an electronic signal corresponding to the measured information.

A TMS can include an optional temperature sensor which can be positioned adjacent to an inlet or an outlet of evaporator 116, or between the inlet and the outlet. The temperature sensor measures temperature information for the refrigerant fluid within evaporator 116 (which represents the evaporating temperature) and transmits an electronic signal corresponding to the measured information. A TMS can also include an optional temperature sensor attached to low heat load 120 and/or high heat load 118, which measures temperature information for the load and transmits an electronic signal corresponding to the measured information.

A TMS can include an optional temperature sensor adjacent to the outlet of evaporator 116 that measures and transmits information about the temperature of the refrigerant fluid as it emerges from evaporator 116.

In certain embodiments, the systems disclosed herein are configured to determine superheat information for the refrigerant fluid based on temperature and pressure information for the refrigerant fluid measured by any of the sensors disclosed herein. The superheat of the refrigerant vapor refers to the difference between the temperature of the refrigerant fluid vapor at a measurement point in the a TMS and the saturated vapor temperature of the refrigerant fluid defined by the refrigerant pressure at the measurement point in the system.

To determine the superheat associated with the refrigerant fluid, the system control system 999 receives information about the refrigerant fluid vapor pressure after emerging from a heat exchanger downstream from evaporator 116, and uses calibration information, a lookup table, a mathematical relationship, or other information to determine the saturated vapor temperature for the refrigerant fluid from the pressure information. The control system 999 also receives information about the actual temperature of the refrigerant fluid, and then calculates the superheat associated with the refrigerant fluid as the difference between the actual temperature of the refrigerant fluid and the saturated vapor temperature for the refrigerant fluid.

The foregoing temperature sensors can be implemented in a variety of ways in a TMS. As one example, thermocouples and thermistors can function as temperature sensors in a TMS. Examples of suitable commercially available temperature sensors for use in a TMS include, but are not limited to, the 88000 series thermocouple surface probes (available from OMEGA Engineering Inc., Norwalk, Conn.).

A TMS can include a vapor quality sensor that measures vapor quality of the refrigerant fluid emerging from evaporator 116. Typically, such a sensor is implemented as a capacitive sensor that measures a difference in capacitance between the liquid and vapor phases of the refrigerant fluid. The capacitance information can be used to directly determine the vapor quality of the refrigerant fluid (e.g., by the system control system 999). Alternatively, such a sensor can determine the vapor quality directly based on the differential capacitance measurements and transmit an electronic signal that includes information about the refrigerant fluid vapor quality. Examples of commercially available vapor quality sensors that can be used in a TMS include, but are not limited to, HBX sensors (available from HB Products, Hasselager, Denmark).

It should be appreciated that in the foregoing discussion, any one or various combinations of two or more sensors discussed in connection with an OCRS can correspond to the first measurement device connected to expansion valve 114, and any one or various combinations of two or more sensors can correspond to the second measurement device connected to expansion valve 414 or back-pressure regulator 306. In general, as discussed previously, a first measurement device provides information corresponding to a first thermodynamic quantity to the expansion valve 114, and a second measurement device provides information corresponding to a second thermodynamic quantity to the expansion valve 414 or back-pressure regulator 306, where the first and second thermodynamic quantities are different, and therefore allow the first and second control device (expansion valve 114 and back pressure regulator 306) to independently control two different system properties (e.g., the vapor quality of the refrigerant fluid and the heat load temperature, respectively).

It should also be understood that a third control device in an OCRS can be adjusted based on a measurement of vapor pressure within receiver 110 and/or by mechanical force applied to a diaphragm within the third control device.

For example, in some embodiments, expansion valve 114 is adjusted (e.g., automatically or by control system 999) based on a measurement of the evaporation pressure ($p_e$) of the refrigerant fluid and/or a measurement of the evaporation temperature of the refrigerant fluid. With expansion valve 114 adjusted in this manner, back-pressure regulator 306 can be adjusted (e.g., automatically or by control system 999) based on measurements of one or more of the following system parameter values: the pressure drop across expansion valve 114, the pressure drop across evaporator 116, the refrigerant fluid pressure in receiver 110, the vapor quality of the refrigerant fluid emerging from evaporator 116 (or at another location in the system), the superheat value of the refrigerant fluid, and the temperature of low heat load 120.

In certain embodiments, expansion valve 114 is adjusted (e.g., automatically or by control system 999) based on a measurement of the temperature of low heat load 120 or high heat load 118. With expansion valve 114 adjusted in this manner, back-pressure regulator can be adjusted (e.g., automatically or by control system 999) based on measurements of one or more of the following system parameter values: the pressure drop across expansion valve 114, the pressure drop across evaporator 116, the refrigerant fluid pressure in receiver 110, the vapor quality of the refrigerant fluid emerging from evaporator 116 (or at another location in the system), the superheat value of the refrigerant fluid, and the evaporation pressure ($p_e$) and/or evaporation temperature of the refrigerant fluid.

In some embodiments, control system 999 adjusts back-pressure regulator 306 based on a measurement of the evaporation pressure $p_c$ of the refrigerant fluid downstream from expansion valve 114 (e.g., measured by a sensor) and/or a measurement of the evaporation temperature of the refrigerant fluid (e.g., measured by a sensor). With expansion valve 114 adjusted based on this measurement, control system 999 can adjust expansion valve 114 based on measurements of one or more of the following system parameter values: the pressure drop ($p_r$–$p_e$) across expansion valve 114, the pressure drop across evaporator 116, the refrigerant fluid pressure in receiver 110 ($p_r$), the vapor quality of the refrigerant fluid emerging from evaporator 116 (or at another location in the system), the superheat value of the refrigerant fluid in the system, and the temperature of low heat load 120 or high heat load 118.

In certain embodiments, control system 999 adjusts back-pressure regulator 306 based on a measurement of the temperature of low heat load 120 or high heat load 118 (e.g., measured by a sensor). Control system 999 can also adjust expansion valve 114 based on measurements of one or more of the following system parameter values: the pressure drop ($p_r - p_e$) across expansion valve 114, the pressure drop across evaporator 116, the refrigerant fluid pressure in receiver 110 ($p_r$), the vapor quality of the refrigerant fluid emerging from evaporator 116 (or at another location in the system), the superheat value of the refrigerant fluid in the system, the evaporation pressure ($p_e$) of the refrigerant fluid, and the evaporation temperature of the refrigerant fluid.

To adjust either expansion valve 114 or back-pressure regulator 306 based on a particular value of a measured system parameter value, control system 999 compares the measured value to a set point value (or threshold value) for the system parameter. Certain set point values represent a maximum allowable value of a system parameter, and if the measured value is equal to the set point value (or differs from the set point value by 10% or less (e.g., 5% or less, 3% or less, 1% or less) of the set point value), control system 999 adjusts expansion valve 114 and/or back-pressure regulator 306 to adjust the operating state of the system, and reduce the system parameter value.

Certain set point values represent a minimum allowable value of a system parameter, and if the measured value is equal to the set point value (or differs from the set point value by 10% or less (e.g., 5% or less, 3% or less, 1% or less) of the set point value), control system 999 adjusts expansion valve 114 and/or back-pressure regulator 306 to adjust the operating state of the system, and increase the system parameter value.

Some set point values represent "target" values of system parameters. For such system parameters, if the measured parameter value differs from the set point value by 1% or more (e.g., 3% or more, 5% or more, 10% or more, 20% or more), control system 999 adjusts expansion valve 114 and/or back-pressure regulator 306 to adjust the operating state of the system, so that the system parameter value more closely matches the set point value.

In the foregoing examples, measured parameter values are assessed in relative terms based on set point values (i.e., as a percentage of set point values). Alternatively, in some embodiments, measured parameter values can be assessed in absolute terms. For example, if a measured system parameter value differs from a set point value by more than a certain amount (e.g., by 1 degree C. or more, 2 degrees C. or more, 3 degrees C. or more, 4 degrees C. or more, 5 degrees C. or more), then control system 999 adjusts expansion valve 114 and/or back-pressure regulator 306 to adjust the operating state of the system, so that the measured system parameter value more closely matches the set point value.

The foregoing examples of thermal management systems illustrate a number of features that can be included in any of the systems within the scope of this disclosure. In addition, a variety of other features can be present in such systems.

In certain embodiments, refrigerant fluid that is discharged from evaporator 116 and passes through conduit can be directly discharged as exhaust from conduit without further treatment. Direct discharge provides a convenient and straightforward method for handling spent refrigerant and has the added advantage that, over time, the overall weight of the system is reduced due to the loss of refrigerant fluid. For systems that are mounted to small vehicles or are otherwise mobile, this reduction in weight can be important.

In some embodiments, however, refrigerant fluid vapor can be further processed before it is discharged. Further processing may be desirable depending upon the nature of the refrigerant fluid that is used, as direct discharge of unprocessed refrigerant fluid vapor may be hazardous to humans and/or may be deleterious to mechanical and/or electronic devices in the vicinity of a TMS. For example, the unprocessed refrigerant fluid vapor may be flammable or toxic, or may corrode metallic device components. In situations such as these, additional processing of the refrigerant fluid vapor may be desirable.

In general, refrigerant processing apparatus can be implemented in various ways. In some embodiments, refrigerant processing apparatus is a chemical scrubber or water-based scrubber. Within apparatus, the refrigerant fluid is exposed to one or more chemical agents that treat the refrigerant fluid vapor to reduce its deleterious properties. For example, where the refrigerant fluid vapor is basic (e.g., ammonia) or acidic, the refrigerant fluid vapor can be exposed to one or more chemical agents that neutralize the vapor and yield a less basic or acidic product that can be collected for disposal or discharged from apparatus.

As another example where the refrigerant fluid vapor is highly chemically reactive, the refrigerant fluid vapor can be exposed to one or more chemical agents that oxidize, reduce, or otherwise react with the refrigerant fluid vapor to yield a less reactive product that can be collected for disposal or discharged from apparatus.

In certain embodiments, refrigerant processing apparatus can be implemented as an adsorptive sink for the refrigerant fluid. Apparatus can include, for example, an adsorbent material bed that binds particles of the refrigerant fluid vapor, trapping the refrigerant fluid within apparatus and preventing discharge. The adsorptive process can sequester the refrigerant fluid particles within the adsorbent material bed, which can then be removed from apparatus and sent for disposal.

In some embodiments, where the refrigerant fluid is flammable, refrigerant processing apparatus can be implemented as an incinerator. Incoming refrigerant fluid vapor can be mixed with oxygen or another oxidizing agent and ignited to combust the refrigerant fluid. The combustion products can be discharged from the incinerator or collected (e.g., via an adsorbent material bed) for later disposal.

As an alternative, refrigerant processing apparatus can also be implemented as a combustor of an engine or another mechanical power-generating device. Refrigerant fluid vapor from conduit can be mixed with oxygen, for example, and combusted in a piston-based engine or turbine to perform mechanical work, such as providing drive power for a vehicle or driving a generator to produce electricity. In certain embodiments, the generated electricity can be used to provide electrical operating power for one or more devices, including high heat load 118. For example, high heat load 118 can include one or more electronic devices that are powered, at least in part, by electrical energy generated from combustion of refrigerant fluid vapor in refrigerant processing apparatus.

The thermal management systems disclosed herein can optionally include a phase separator upstream from the refrigerant processing apparatus.

Particularly during start-up of the systems disclosed herein, liquid refrigerant may be present in conduits because the systems generally begin operation before a high temperature heat load and/or low or high heat loads are activated. Accordingly, phase separator functions in a manner similar to phase separators to separate liquid refrigerant fluid from refrigerant vapor. The separated liquid refrigerant fluid can be re-directed to another portion of the system, or retained within phase separator until it is converted to refrigerant vapor. By using phase separator, liquid refrigerant fluid can be prevented from entering refrigerant processing apparatus.

In some embodiments, the refrigeration systems disclosed herein can be combined with power systems to form integrated power and thermal systems, in which certain components of the integrated systems are responsible for providing refrigeration functions and certain components of the integrated systems are responsible for generating operating power.

Figure 7:
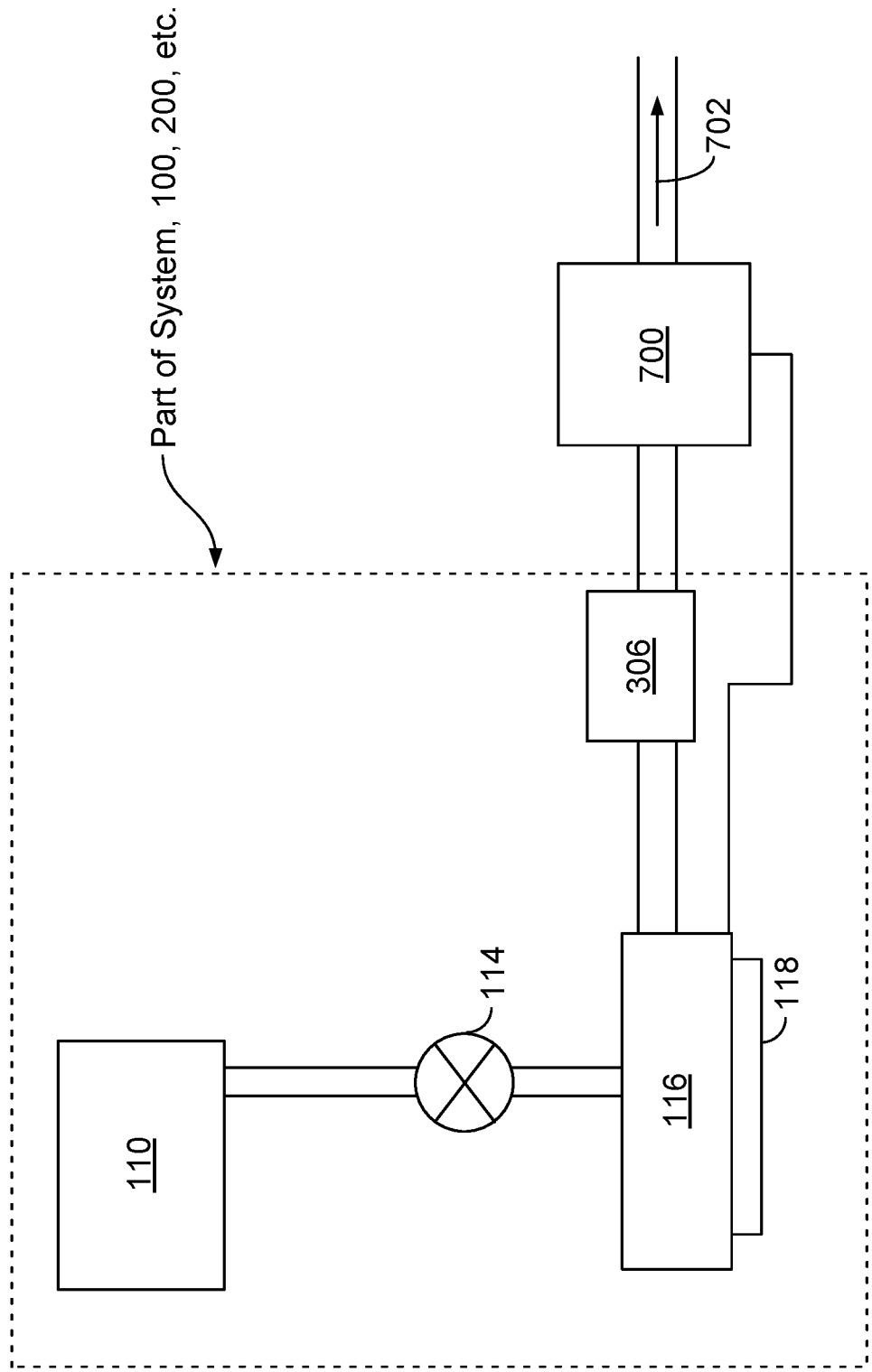
FIG. 7 is a schematic diagram of an example of a TMS that includes or is coupled to a power generation apparatus according to the present disclosure.

FIG. 7 shows an integrated power and TMS that includes many features similar to those discussed above (e.g., see FIGS. 1-4) with only aspects of the open-circuit portions shown. In example implementations, a TMS or portion of a TMS is coupled to or is part of an engine 700 with an inlet that receives the stream of waste refrigerant fluid. Engine 700 can combust the waste refrigerant fluid directly, or alternatively, can mix the waste refrigerant fluid with one or more additives (such as oxidizers) before combustion. Where ammonia is used as the refrigerant fluid in a TMS, suitable engine configurations for both direct ammonia combustion as fuel, and combustion of ammonia mixed with other additives, can be implemented. In general, combustion of ammonia improves the efficiency of power generation by the engine.

The energy released from combustion of the refrigerant fluid can be used by engine 700 to generate electrical power, e.g., by using the energy to drive a generator. The electrical power can be delivered via electrical connection to high heat load 118 to provide operating power for the high heat load 118. For example, in certain embodiments, high heat load 118 includes one or more electrical circuits and/or electronic devices, and engine 700 provides operating power to the circuits/devices via combustion of refrigerant fluid. Byproducts 702 of the combustion process can be discharged from engine 700 via exhaust conduit, as shown in FIG. 7.

Various types of engines and power-generating devices can be implemented as engine 700 with a TMS. In some embodiments, for example, engine 700 is a conventional four-cycle piston-based engine, and the waste refrigerant fluid is introduced into a combustor of the engine. In certain embodiments, engine 700 is a gas turbine engine, and the waste refrigerant fluid is introduced via the engine inlet to the afterburner of the gas turbine engine. As discussed above, in some embodiments, a TMS can include a phase separator (not shown) positioned upstream from engine 700. Phase separator functions to prevent liquid refrigerant fluid from entering engine 700, which may reduce the efficiency of electrical power generation by engine 700.

In some aspects, the thermal management systems and methods disclosed herein can be implemented as part of (or in conjunction with) directed energy systems such as high energy laser systems. Due to their nature, directed energy systems typically present a number of cooling challenges, including certain heat loads for which temperatures are maintained during operation within a relatively narrow range.

Figure 8:
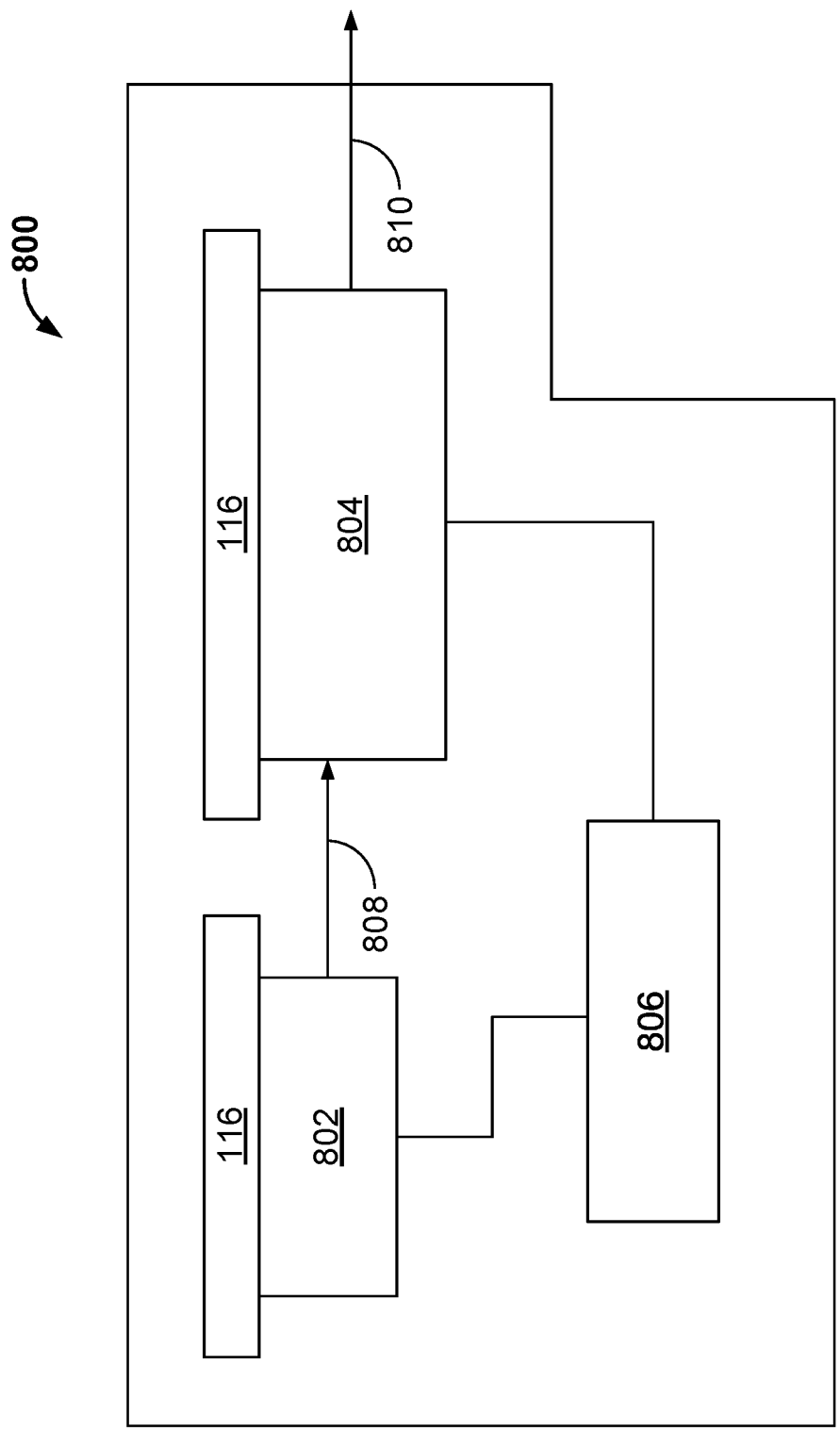
FIG. 8 is a schematic diagram of an example of directed energy system that includes a TMS according to the present disclosure.

FIG. 8 shows one example of a directed energy system, specifically, a high energy laser system 800. System 800 includes a bank of one or more laser diodes 802 and an amplifier 804 both connected to a power source 806. During operation, laser diodes 802 generate an output radiation beam 808 that is amplified by amplifier 804 and directed as an output beam 810 onto a target. Generation of high energy output beams can result in the production of significant quantities of heat. Certain laser diodes, however, are relatively temperature sensitive, and the operating temperature of such diodes is regulated within a relatively narrow range of temperatures to ensure efficient operation and avoid thermal damage. Amplifiers are also temperature-sensitively, although typically less sensitive than diodes.

To regulate the temperatures of various components of directed energy systems such as diodes 802 and amplifier 804, such systems can include components and features of the thermal management systems disclosed herein. In FIG. 8, evaporator 116 is coupled to diodes 802 and/or amplifier 804. The other components of the thermal management systems disclosed herein are not shown for clarity. However, it should be understood that any of the features and components discussed above can optionally be included in directed energy systems. Diodes 802, due to their temperature-sensitive nature, effectively function as high heat load 118 in system 800, while amplifier 804 functions as low heat load 120.

System 800 is one example of a directed energy system that can include various features and components of the thermal management systems and methods described herein. However, it should be appreciated that the thermal management systems and methods are general in nature, and can be applied to cool a variety of different heat loads under a wide range of operating conditions.

A number of embodiments have been described. Nevertheless, it will be understood that various modifications may be made without departing from the spirit and scope of the disclosure. Accordingly, other embodiments are within the scope of the following claims.

What is claimed is:

1. A thermal management system, comprising:
   a closed-circuit refrigeration system (CCRS) comprising:
   a vapor cycle system (VCS) comprising:
   a receiver configured to store a refrigerant fluid;
   a liquid separator comprising an inlet, a vapor-side outlet and a liquid-side outlet;
   a compressor comprising a compressor inlet fluidly coupled to the vapor-side outlet;
   a condenser fluidly coupled to a compressor outlet of the compressor;
   at least one evaporator comprising an evaporator inlet coupled in the VCS, with the evaporator configured to extract heat from at least one heat load that is in proximity to or in thermal conductive or convective contact with the at least one evaporator;
   an expansion valve comprising an inlet coupled to an outlet of the receiver; and
   a thermal energy storage (TES) that stores a phase change material, the TES comprising a heat exchanger that provides thermal interaction between the phase change material and the refrigerant fluid;
   a liquid pumping system (LPS) that comprises the TES, the at least one evaporator, and the liquid separator, the liquid pumping system further comprising a pump, the pump configured to circulate liquid refrigerant from the liquid-side outlet of the liquid separator into the evaporator inlet; and
   wherein the VCS is configured to operate one at a time in at least one of three operational modes that are a TES cooling mode, a heat load cooling mode, or a pump-down mode, and the LPS is configured to operate in the heat load cooling mode.

2. The system of claim 1, wherein the TES cooling mode charges the TES and the phase change material in the TES by directing refrigerant through the TES from the receiver causing cooling energy from the refrigerant fluid to be stored in the phase change material in latent heat form.

3. The system of claim 1, wherein the liquid pumping system is configured to evaporate refrigerant fluid at a temperature in a range that is below a heat load temperature low limit and above a phase change material freezing temperature.

4. The system of claim 1, wherein, in the pump-down mode, the refrigerant liquid accumulated in the liquid separator is returned to the receiver.

5. The system of claim 1, further comprising a recuperative heat exchanger comprising a pair of refrigerant fluid paths, with a first refrigerant fluid path coupled downstream of the receiver and a second refrigerant fluid path coupled upstream of the liquid separator.

6. The system of claim 1, wherein the refrigerant comprises ammonia or carbon dioxide.

7. The system of claim 1, further comprising at least one heat load that is cooled by the TES operating in the heat load cooling mode.

8. The system of claim 7, wherein the liquid pumping system is configured to cool the at least one heat load by discharging the stored cooling energy from the phase change material to the at least one evaporator.

9. The system of claim 1, wherein the expansion valve is configured to iso-enthalpically expand the liquid refrigerant from the receiver to a low-pressure, two-phase refrigerant fluid.

10. The system of claim 9, wherein a portion of a refrigerant liquid of the low-pressure, two-phase refrigerant fluid phase evaporates to cool the phase change material in the TES, with the liquid separator disposed to receive non-evaporated refrigerant liquid.

11. The system of claim 1, wherein the expansion valve is a first expansion valve and the TES is a first TES, the system further comprising:
    a second expansion valve comprising an inlet coupled to the outlet of the receiver;
    a second TES comprising an inlet coupled to an outlet of the second expansion valve and an outlet coupled to the inlet of the liquid separator, and
    wherein the system implements the following sequence with the first TES cooling a low heat load with the VCS off, the second TES cooling the low heat load, and the VCS cooling the first TES and the low heat load is OFF, and the VCS cooling the second TES.

12. The system of claim 11, wherein the pump is configured to circulate refrigerant liquid from the liquid-side outlet through at least one of first or second TES to subcool the refrigerant liquid and transport the subcooled refrigerant liquid to the evaporator, causing complete or partial evaporation of the refrigerant, with refrigerant vapor formed in the evaporator being captured by the liquid separator.

13. The system of claim 1, wherein the VCS operates according to a transcritical refrigeration cycle or a subcritical refrigeration cycle.

14. The system of claim 13, wherein when the VCS operates in the transcritical refrigeration cycle, the condenser operates as a gas cooler, and the compressor induces refrigerant vapor from the vapor-side outlet of the liquid separator at a low pressure and compresses the refrigerant vapor at the low pressure into a refrigerant vapor at a high pressure and high temperature, with the refrigerant vapor at the high pressure and high temperature being cooled in the gas cooler.

15. The system of claim 13, wherein when the VCS operates in a subcritical refrigeration cycle, the compressor induces refrigerant vapor from the vapor-side outlet of the liquid separator at a low pressure and compresses the refrigerant vapor at the low pressure into a refrigerant vapor at a high pressure and temperature, with the refrigerant vapor in the condenser being de-superheated, condensed, and subcooled.

16. The system of claim 1, wherein the pump is configured to circulate liquid refrigerant from the liquid-side outlet of the liquid separator into an inlet of the TES.

17. The system of claim 16, wherein when the phase change material melts, the stored thermal energy is depleted and the heat load cooling mode has completed a cycle of operation.

18. The system of claim 16, further comprising an ejector comprising a primary inlet, a secondary inlet, and an outlet fluidly coupled to the evaporator inlet.

19. The system of claim 1, wherein the VCS is configured, with the compressor in an off state, to increase a refrigerant pressure to turn the refrigerant fluid that is in a saturated refrigerant liquid thermodynamic state in the liquid separator into a subcooled state, and the pump is configured to circulate the subcooled refrigerant liquid through the evaporator to cause at least partial evaporation of the refrigerant liquid into refrigerant vapor that is transported to the TES to be condensed and subcooled.

20. The system of claim 19, wherein the compressor is configured to increase a cooling capacity of the VCS in an on state.

21. The system of claim 19, wherein the VCS is configured to return the subcooled refrigerant liquid to the liquid separator, and to complete a cycle of the heat load cooling mode by melting the phase change material and depleting the stored thermal energy.

22. The system of claim 21, wherein the refrigerant comprises ammonia or carbon dioxide.

23. The system of claim 1, further comprising:
    an open-circuit refrigerant system (OCRS) comprising the receiver, the expansion valve, the TES, the evaporator, and the liquid separator, with the expansion valve configured to control vapor quality of refrigerant fluid at the outlet of the evaporator, the OCRS further comprising:
    an exhaust line; and
    a back-pressure regulator comprising an inlet coupled to the VCS and comprising an outlet coupled to the exhaust line, with the back-pressure regulator configured to control a temperature of the heat load.

24. The system of claim 23, wherein the VCS operates according to a sub critical refrigeration cycle.

25. The system of claim 23, further comprising a recuperative heat exchanger comprising a pair of refrigerant fluid paths, with a first refrigerant fluid path coupled downstream of the receiver and a second refrigerant fluid path coupled upstream of the liquid separator.

26. The system of claim 25, wherein the recuperative heat exchanger is configured to provide thermal contact between the liquid refrigerant leaving the receiver and the refrigerant vapor from the liquid separator.

27. The system of claim 1, wherein the at least one evaporator is a first evaporator and the at least one heat load is a first heat load, and the system further comprises a second evaporator.

28. The system of claim 27, wherein the second evaporator has an inlet coupled to a receiver outlet and the second evaporator has an outlet coupled to a compressor inlet.

29. The system of claim 28, wherein the second evaporator is configured to cool a second heat load that has a higher temperature than the first heat load, and the system further comprises a second expansion valve coupled to the receiver outlet and the inlet to the second evaporator.

30. The system of claim 29, wherein the refrigerant comprises ammonia or carbon dioxide.

31. A thermal management method, comprising:
transporting a refrigerant fluid along a closed-circuit refrigerant fluid flow path that includes a vapor cycle system (VCS), with the VCS comprising a receiver comprising a receiver outlet fluidly coupled to: a thermal energy storage (TES) that stores a phase change material, to a liquid separator comprising a liquid separator inlet, and to an evaporator in thermal contact with a heat load, with the liquid separator comprising a vapor-side fluidly coupled to a compressor and a condenser fluidly coupled to a compressor outlet, and with the condenser comprising a condenser outlet fluidly coupled to a receiver inlet, wherein transporting the refrigerant fluid from the receiver comprises:
transporting the refrigerant fluid through an expansion valve, and
controlling a vapor quality of the refrigerant fluid at an outlet of the evaporator with the expansion valve;
operating the VCS according to at least one of three operational modes that comprise: a TES cooling mode, a heat load cooling mode, or a pump-down mode; and
discharging a portion of refrigerant vapor from the vapor-side outlet through an open-circuit refrigerant system (OCRS) comprising the receiver, the expansion valve, the TES, the evaporator, and the liquid separator, and with the OCRS further comprising:
a flow control device configurable to control a temperature of the heat load; and
an exhaust line, with the discharged portion of the refrigerant vapor not returning to the receiver.

32. The method of claim 31, further comprising operating the VCS in the TES cooling mode by charging the phase change material in the TES by directing refrigerant through the TES, from the receiver to store cooling energy in the phase change material in latent heat form.

33. The method of claim 31, further comprising directing the refrigerant through a recuperative heat exchanger comprising a pair of refrigerant fluid paths, with a first refrigerant fluid path coupled downstream of the receiver and a second refrigerant fluid path coupled upstream of the liquid separator.

34. The method of claim 31, further comprising directing the refrigerant through a primary inlet of an ejector, with the ejector further comprising a secondary inlet and an outlet fluidly coupled to the evaporator inlet.

35. The method of claim 31, wherein the refrigerant fluid comprises ammonia or carbon dioxide.

36. The method of claim 31, further comprising thermally contacting the phase change material and the refrigerant fluid in the TES.

37. The method of claim 36, further comprising operating the VCS in the TES cooling mode by charging the phase change material in the TES by directing refrigerant through the TES, from the receiver to store cooling energy in the phase change material in latent heat form.

38. The method of claim 31, further comprising isoenthalpically expanding the liquid refrigerant from the receiver in the expansion valve to a low-pressure two-phase mixture of a refrigerant liquid phase and a refrigerant vapor phase.

39. The method of claim 38, further comprising:
boiling a portion of the refrigerant liquid phase out from the phase change material in the TES; and
capturing non-evaporated refrigerant liquid by the liquid separator.

40. The method of claim 31, further comprising operating the VCS according to a transcritical refrigeration cycle or a subcritical refrigeration cycle.

41. The method of claim 40, further comprising:
operating the VCS in the transcritical refrigeration cycle by causing the condenser to operate as a gas cooler;
compressing, by the compressor, vapor from a vapor-side outlet of the liquid separator that is induced at a low pressure to compress the refrigerant vapor at the low pressure into a refrigerant vapor at a high pressure and high temperature;
cooling the refrigerant vapor at the high pressure and high temperature in the gas cooler.

42. The method of claim 40, further comprising:
operating the VCS in the subcritical refrigeration cycle; and
condensing the refrigerant vapor in the condenser by de-superheating, condensing, and subcooling the refrigerant vapor to produce subcooled refrigerant liquid.

43. The method of claim 31, wherein the evaporator is a first evaporator and the heat load is a first head load, and the method further comprises directing a portion of the refrigerant fluid from the receiver to a second evaporator.

44. The method of claim 43, further comprising cooling a second heat load with the second evaporator, the second heat load having a higher temperature than the first heat load.

45. The method of claim 44, wherein the refrigerant comprises ammonia or carbon dioxide.

46. The method of claim 31, wherein the closed-circuit refrigerant fluid flow path further includes a liquid pumping system that includes a pump, the method further comprising operating the liquid pumping system to cool the heat load by discharging the stored cooling energy from the phase change material.

47. The method of claim 46, further comprising evaporating, with the liquid pumping system, refrigerant at a temperature in a range that is below a heat load temperature low limit and above a phase change material freezing temperature.

48. The method of claim 47, wherein when the compressor is in an off state, the method further comprises:
converting refrigerant pressure of the refrigerant in the VCS that is in a saturated refrigerant liquid thermodynamic state in the liquid separator into a subcooled state; and
circulating, with the pump, the subcooled refrigerant liquid through the evaporator to cause complete or partial evaporation of the refrigerant fluid, with refrigerant vapor formed in the evaporator being captured by and condensed and subcooled in the TES.

49. The method of claim 48, further comprising:
returning the subcooled refrigerant liquid to the liquid separator; and
completing a cycle of operation of the heat load cooling mode when the phase change material has melted and the stored thermal energy is depleted.

50. The method of claim 49, wherein the refrigerant fluid comprises ammonia or carbon dioxide.

\* \* \* \* \*